United States Patent Office 3,109,843
Patented Nov. 5, 1963

3,109,843
PROCESS FOR PREPARING 5-PHENYL-1,2-DIHYDRO-3H-1,4-BENZODIAZEPINES
Earl Reeder, Nutley, and Leo Henryk Sternbach, Upper Montclair, N.J., assignors to Hoffmann-La Roche Inc., Nutley, N.J., a corporation of New Jersey
No Drawing. Filed June 21, 1962, Ser. No. 204,041
4 Claims. (Cl. 260—239)

This invention relates to a novel class of heterocyclic compounds which have valuable medicinal properties. Also included within the scope of the invention are methods for the preparation of these compounds as well as certain novel intermediates therefor.

The novel medicinally valuable heterocyclic compounds of this invention can be characterized as 5-phenyl-1,2-dihydro-3H-1,4-benzodiazepines and 5-phenyl-1,2,4,5-tetrahydro-3H-1,4-benzodiazepines.

More particularly the novel heterocyclic compounds of the invention are selected from the group consisting of compounds of the formula

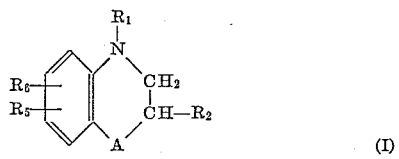

and acid-addition salts of the basic compounds conforming to said formula, wherein A is selected from the group consisting of

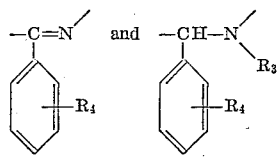

$R_1$ and $R_3$ are selected from the group consisting of hydrogen, lower alkyl, lower alkenyl, and lower alkanoyl; $R_2$ is selected from the group consisting of hydrogen and lower alkyl; and $R_4$, $R_5$, and $R_6$ are selected from the group consisting of hydrogen, halogen, trifluoromethyl, nitro, amino, lower alkanoylamino, lower alkylthio, lower alkylsulfonyl, lower alkylsulfinyl, lower alkoxy, hydroxy, lower alkyl, cyano, carboxy, carbo-lower alkoxy, carbamyl, and di-lower alkylamino.

As used in this disclosure, the term "lower alkyl" comprehends both straight and branched chain carbon-hydrogen radicals, such as methyl, ethyl, propyl, isopropyl, butyl, and the like. The term "lower alkenyl" includes straight and branched chained carbon-hydrogen radicals, wherein at least one carbon to carbon bond is unsaturated, such as allyl and the like. The term "lower alkanoyl" includes the acyl residue of lower alkanoic acids, for example, acetyl, propionyl, and the like. Preferred compounds of the invention are those of Formula I above, wherein $R_4$, $R_5$, and $R_6$ are selected from the groups consisting of hydrogen, halogen, trifluoromethyl, nitro, lower alkylthio, lower alkylsulfinyl, cyano, amino, and di-lower alkylamino.

Especially preferred are those bearing a substituent in the 7 and/or 2' position. Especially preferred substituents are halogen, trifluoromethyl and amino.

The basic members of the group of compounds defined by Formula I above form acid-addition salts. The basic members are those wherein no more than one of $R_1$ and $R_3$ is lower alkanoyl. These compounds form medicinally acceptable acid-addition salts with pharmaceutically acceptable acids, including both inorganic and organic acids, such as nitric acid, sulfuric acid, hydrochloric acid, hydrobromic acid, phosphoric acid, acetic acid, citric acid, succinic acid, benzoic acid, formic acid, p-toluene sulfonic acid, and the like.

Compounds falling under the scope of Formula I above which can be characterized as 5-phenyl-1,2-dihydro-3H-1,4-benzodiazepines are of the formula

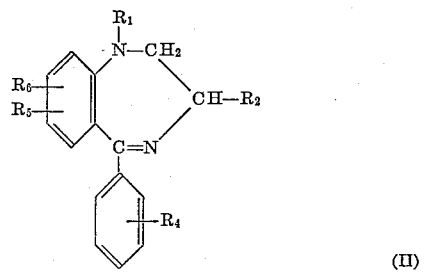

wherein $R_1$, $R_2$, $R_4$, $R_5$ and $R_6$ have the same meaning as above.

Compounds falling under the scope of Formula I above which can be characterized as 5-phenyl-1,2,4,5-tetrahydro-3H-1,4-benzodiazepines are of the formula

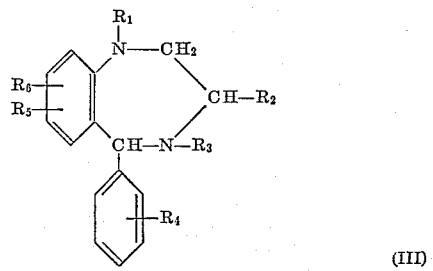

wherein $R_1$, $R_2$, $R_3$, $R_4$, $R_5$, and $R_6$ have the same meaning as above.

Compounds of Formula I above, which is inclusive of the compounds of Formulas II and III above, and medicinally acceptable acid-addition salts of such compounds, are valuable therapeutic agents being useful as muscle relaxants, sedatives, and anticonvulsants. These compounds can be administered internally, for example, parenterally or orally, and can be compounded into conventional pharmaceutical dosage forms with amounts adjusted to individual requirements, such as tablets, capsules, lozenges, suppositories, suspensions, solutions, and the like.

The novel heterocyclic compounds of this invention conforming to Formula I above can be prepared by several diverse reactions from a variety of starting materials. Certain of the processes, as set forth below, are applicable to the preparation of compounds of Formulas I–III above containing only certain of the substituents encompassed by the symbols $R_1$, $R_3$, $R_4$, $R_5$, and $R_6$. The substituents to which each process is applicable are set out below in the description of the particular process involved.

One process for the preparation of compounds corresponding to Formula I above comprises reacting a compound selected from the group consisting of compounds of the formula

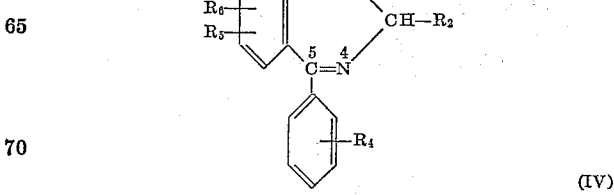

and 4,5-dihydro derivatives thereof of the formula

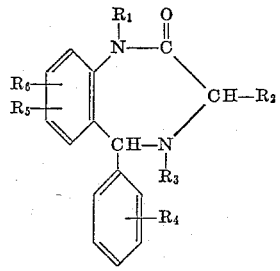

(IVa)

wherein $R_1$ and $R_3$ are selected from the group consisting of hydrogen, lower alkyl, lower alkenyl, and lower alkanoyl; $R_2$ is selected from the group consisting of hydrogen and lower alkyl; $R_4$, $R_5$, and $R_6$ are selected from the group consisting of hydrogen, halogen, trifluoromethyl, amino, nitro, lower alkylthio, lower alkylsulfonyl, lower alkylsulfinyl, lower alkoxy, hydroxy, lower alkyl and di-lower alkylamino; with lithium aluminum hydride. This reaction can be performed at room temperature as well as above or below room temperature. The reaction is preferably carried out in an inert organic solvent, such as tetrahydrofuran, benzene, dioxane, diethyl ether, or the like. The reaction is effected under anhydrous conditions. Treatment of compounds of Formula IV above with lithium aluminum hydride has been found to yield compounds corresponding to Formulas II and III above. Treatment of compounds corresponding to Formula IVa of course yields compounds corresponding to only Formula III. When reacting compounds of Formula IV with lithium aluminum hydride, it has been found that the application of heat favors the formation of the compounds of Formula III above, as does the presence of a substituent in the 1-position, i.e., where $R_1$ is other than hydrogen. In cases where compounds conforming to Formula II above are formed, further treatment with a suitable reducing agent will result in the production of the tetrahydro derivative conforming to the Formula III above. Treatment of compounds of Formulae IV and IVa with lithium aluminum hydride wherein one or more of $R_3$, $R_4$, $R_5$ and $R_6$ is a substituent susceptible to reduction by lithium aluminum hydride, will of course result in the reduction of said substituent or substituents. For example, if any of $R_4$, $R_5$ or $R_6$ is nitro in the starting material of Formulae IV or IVa above, said substituent would be reduced to amino in the corresponding end product of Formula I above. Similarly, any lower alkylsulfinyl group present would be reduced to lower alkylthio. Also, when $R_3$ is lower alkanoyl reduction to lower alkyl is obtained.

A second method of producing compounds corresponding to Formula II above comprises reacting a compound of the formula

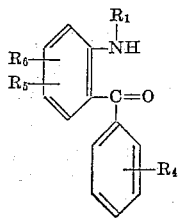

(V)

wherein $R_1$ is selected from the group consisting of hydrogen, lower alkyl, and lower alkenyl; $R_4$, $R_5$, and $R_6$ are selected from the group consisting of hydrogen, halogen, trifluoromethyl, nitro, amino, lower alkanoylamino, lower alkylthio, lower alkylsulfonyl, lower alkylsulfinyl, lower alkoxy, hydroxy, lower alkyl, cyano, carboxy, carbo-lower alkoxy, carbamyl and di-lower alkylamino, with a compound of the formula

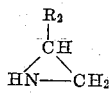

(VI)

wherein $R_2$ is selected from the group consisting of hydrogen and lower alkyl.

The compounds of Formula VI above are ethyleneimine or 2-lower alkyl-ethyleneimine. The above reaction can be conducted at room temperature or above or below room temperature, but it is preferably effected with the application of heat. Temperatures of from about 20° C. to about 100° C. are preferred. Further, the reaction is preferably conducted in the presence of an inert organic solvent such as tetrahydrofuran, benzene, dioxane, diethyl ether, or the like.

Still another method of preparing compounds corresponding to Formula II above comprises treating a compound of the formula

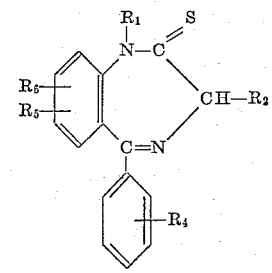

(VII)

wherein $R_1$ is selected from the group consisting of hydrogen, lower alkyl, and lower alkenyl; $R_2$ is selected from the group consisting of hydrogen and lower alkyl; $R_4$, $R_5$, and $R_6$ are selected from the group consisting of hydrogen, halogen, trifluoromethyl, amino, lower alkanoylamino, lower alkoxy, hydroxy, lower alkyl, cyano, carboxy, carbo-lower alkoxy, carbamyl, and di-lower alkylamino, with Raney nickel in the presence of a suitable solvent. The reaction can be effected at room temperature or below or with the application of heat. It is preferably effected by refluxing the reaction mixture. The reaction can preferably be conducted in an inert organic solvent, such as acetone, ethanol, dioxane, tetrahydrofuran, or the like.

Yet another method for obtaining compounds corresponding to Formula II above comprises reacting a compound of the formula

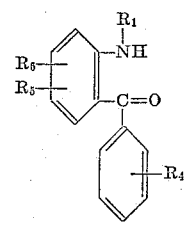

(VIII)

wherein $R_1$ is selected from the group consisting of hydrogen, lower alkyl, lower alkenyl, and tosyl; $R_4$, $R_5$, and $R_6$ are selected from the group consisting of hydrogen, halogen, lower alkanoylamino, trifluoromethyl, nitro, lower alkylthio, lower alkylsulfonyl, lower alkylsulfinyl, lower alkoxy, lower alkyl, carboxy, carbo-lower alkoxy, cyano, carbamyl and di-lower alkylamino, with a β-acyl-aminoethyl halide and hydrolyzing the resultant corresponding compound of the formula

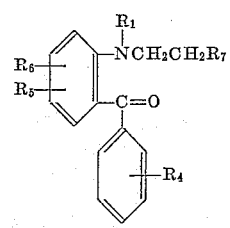

(IX)

wherein $R_1$, $R_4$, $R_5$, and $R_6$ have the same meaning as in Formula VIII above, and $R_7$ is the acylamino moiety of the β-acylaminoethyl halide reactant. While β-acylaminoethyl bromides are preferred, other halides, such as the chlorides, can be used. The term "acyl" as used in the term "β-acylaminoethyl halide" includes hydrolyzable acid residues, such as benzoyl, phthaloyl, tosyl, lower alkanoyl, and the like. Thus, exemplary of β-acylaminoethyl halide reactants are compounds such as β-bromoethylbenzamide, β-bromoethylphthalimide, β-tosylaminoethyl bromide, and the like.

The condensation of the β-acylaminoethyl halide with the compound of Formula VIII above can preferably be effected in an inert organic solvent, such as nitromethane, N,N-dimethylformamide, dichlorobenzene, pyridine, and the like. The condensation is preferably effected at elevated temperatures, such as between about 100° C. and about 200° C. The solvent should be sufficiently high boiling so as to not volatilize at the temperature of the reaction. The second step of the above method, i.e., the hydrolysis of the acyl group, is preferably conducted in acid media. One preferred embodiment comprehends the use of strong mineral acids, such as sulfuric acid, hydrochloric acid, and the like. The hydrolysis reaction can be conducted at room temperature or elevated temperatures, and is preferably conducted with the application of heat. When starting materials of Formula VIII above are used with acid hydrolysis susceptible substituents, intermediates of Formula IX are obtained with the same substituents, but the substituents are hydrolyzed upon the above described hydrolysis step. For example, trifluoromethyl, carbo-lower alkoxy, cyano and carbamyl substituents all hydrolyze to carboxy and lower alkanoylamino hydrolyzes to amino.

In another process embodiment of the invention compounds of Formula II above can be produced via reaction of an alkylene-1,2-diamine of the formula

$$H_2NCH_2\overset{R_2}{\underset{|}{C}}HNH_2 \qquad (X)$$

wherein $R_2$ has the same meaning as above, with a benzophenone containing a halogen substituent ortho to the carbonyl group. The o-halobenzophenones used are thus of the formula

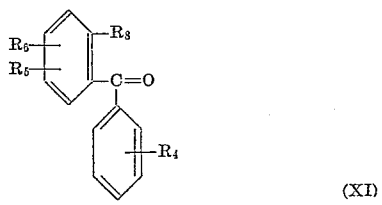

(XI)

wherein $R_4$, $R_5$ and $R_6$ have the same meaning as in Formula I above, and $R_8$ is halogen. The process can either proceed directly, or through intermediates of the formula

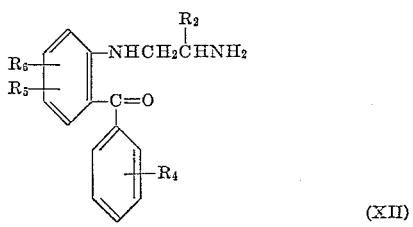

(XII)

wherein $R_2$, $R_4$, $R_5$ and $R_6$ have the same meaning as in Formula I above, which can then be cyclized to compounds of Formula II above.

The alkylene-1,2-diamine, for example ethylenediamine, can be used in excess and serve as the reaction media. In the alternative a conventional inert organic solvent, e.g. alcohol or a tertiary base such as pyridine, picoline, quinoline or the like, can be used as the reaction media. In a preferred embodiment the reaction is effectuated at an elevated temperature, for example above about 75° C. The maximum temperature would, of course, be the boiling point of the reaction media. The halogen, besides by the carbonyl substitutent adjacent thereto, can be additionally activated via the presence of another substituent ortho or para thereto. Preferred activating substituents are trifluoromethyl, nitro, lower alkylsulfinyl, cyano, carboxy, carbo-lower alkoxy, carbamyl and the like. A preferred embodiment of this process comprises reacting ethylenediamine with a 2-halobenzophenone bearing in the 5-position an activating substituent selected from the group consisting of trifluoromethyl, nitro, lower alkyl sulfinyl, cyano, carboxy, carbo-lower alkoxy, and carbamyl. As stated above this condensation yields compounds of Formula II above.

The compounds of Formula IX and XII above are novel intermediates and are comprehended by the scope of the present invention. The compounds of Formulas IVa and VII, on the other hand, are illustrative of compounds not forming a part of the present invention, but whose preparation is disclosed herein in order that the present disclosure may be complete. Similarly, as indicated in the examples, the preparation of other starting materials, which are not a part of the invention, is disclosed herein in order that the present disclosure may be complete.

Compounds corresponding to Formulas I through III above, which are obtained by the various processes of this invention, can be converted to other compounds corresponding to Formulas I through III above. For example, compounds corresponding to Formulas I through III above wherein either $R_1$ or $R_3$ is hydrogen can be converted to corresponding compounds wherein the hydrogen is replaced with lower alkyl, lower alkenyl, or lower alkanoyl by alkylation, alkenylation, or alkanoylation. Compounds corresponding to Formula III can be obtained by reduction of compounds corresponding to Formula II. Compounds wherein one of $R_5$ and $R_6$ is hydrogen can be nitrated. Compounds wherein $R_4$, $R_5$ or $R_6$ is amino can be acylated to yield corresponding compounds bearing a lower alkanoylamino substituent, or can be reacted to effect exchange of the amino group for a cyano or halogen substituent. Furthermore, compounds wherein $R_4$, $R_5$ or $R_6$ is amino can be prepared by reduction of corresponding compounds bearing a nitro substituent.

This application is a continuation-in-part of application Serial No. 156,988, filed December 4, 1961, now abandoned, and of application Serial No. 127,493, filed July 28, 1961, now abandoned.

The following examples are illustrative but not limitative of the invention. Other embodiments will be obvious to those skilled in the art and are comprehended by the scope of the invention. All temperatures are stated in degrees centigrade, and all melting points are corrected.

*Example 1*

To a mixture of 6 g. of lithium aluminum hydride and 100 ml. of dry tetrahydrofuran was added in small portions with stirring a solution of 21.6 g. of 7-chloro-5-phenyl-3H-1,4-benzodiazepin-2(1H)-one in 300 cc. of dry tetrahydrofuran. The mixture was refluxed until it darkened (about 10 minutes). It was then cooled to room temperature and stirred for an additional 30 minutes. The excess of lithium aluminum hydride was decomposed with ethyl acetate and wet ether. The mixture was filtered over hyflo, the organic layer was separated, dried and concentrated in vacuo. The residue was crystallized from ether and yielded 7-chloro-5-phenyl-1,2-dihydro-3H-1,4-benzodiazepine which on recrystallization from petroleum ether (B.P. 30–60°) formed yellow needles melting at 170–71°.

7-chloro-5-phenyl - 3H - 1,4-benzodiazepin-2(1H)-one used as a starting material above is not a part of the present invention but its preparation is disclosed hereinbelow in order that the present disclosure may be complete.

25 g. of anhydrous hydrogen chloride were introduced into a stirred mixture containing 23.2 g. of 2-amino-5-chlorobenzophenone, 15 g. of glycine and 250 ml. of pyridine. 25 ml. of pyridine were distilled off and the mixture was refluxed for 24 hours. 50 ml. of pyridine were then distilled off and an additional 25 g. of hydrogen chloride were introduced, followed by the distillation of 50 ml. of pyridine. Fresh pyridine was added after each distillation in order to keep the volume constant. The mixture was refluxed for an additional 24 hours and was then concentrated in vacuo. The residue was partitioned between benzene and water and then the benzene layer was washed with water. After drying over magnesium sulfate, the benzene solution was concentrated in vacuo. The residue, 7 - chloro-5-phenyl-3H-1,4-benzodiazepin-2(1H)-one, was crystallized from a mixture of ether-petroleum ether and washed with boiling ether.

Example 2

To a cooled, stirred suspension of 8.9 g. of anhydrous aluminum chloride in 100 ml. of dry benzene was added 20 g. of 2-amino-5-chlorobenzophenone. The reaction mixture was heated to reflux temperature, then the heating was stopped and a solution of 1.9 g. of ethylene-imine in 25 cc. of benzene was added in small portions. The reaction mixture was stirred for about 30 minutes and poured on ice. After the addition of 30 g. of potassium hydroxide, the organic layer was separated, washed with 2 N hydrochloric acid.

The aqueous acidic layer was made alkaline with dilute alkali and extracted with ether. The ether layer was dried and concentrated in vacuo. The residue crystallized from ether and yielded 7-chloro-5-phenyl-1,2-dihydro-3H-1,4-benzodiazepine.

Example 3

A solution of 1 g. of 7-chloro-5-phenyl-1,2-dihydro-3H-1,4-benzodiazepine in a mixture of 15 ml. of pyridine and 10 cc. of acetic anhydride was left at room temperature for 5 hours and then concentrated in vacuo to dryness. The residue was crystallized from ether and yielded 1-acetyl-7-chloro-5-phenyl-1,2-dihydro - 3H - 1,4-benzodiazepine which on recrystallization from a mixture of methylene chloride, ether and petroleum ether formed colorless prisms melting at 165–6°.

Example 4

To 6.9 g. of lithium aluminum hydride in 150 ml. of dry tetrahydrofuran was added a solution of 21 g. of 7-chloro - 4,5 - dihydro - 5 - phenyl - 3H-1,4-benzodiazepin-2(1H)-one in 300 ml. of tetrahydrofuran. The addition was carried out as fast as the foaming permitted. Then the mixture was heated to reflux, and the violent reaction moderated by cooling. The mixture was then stirred at room temperature until the reaction subsided, then refluxed for ½ hour, decomposed with ethyl acetate and wet ether, and filtered over hyflo. The organic layer was separated, dried and concentrated in vacuo to dryness. The oily residue was dissolved in methanol and acidified with a slight excess of methanolic hydrogen chloride. Acetone was added causing the crystallization of the crude 7 - chloro - 5-phenyl-1,2,4,5-tetrahydro-3H-benzodiazepine hydrochloride which was filtered off. A further sample was crystallized from a mixture of methanol and acetone and formed slightly yellow plates of 7-chloro-5-phenyl-1,2,4,5 - tetrahydro-3H-benzodiazepine hydrochloride melting at 259–60° with decomposition.

7 - chloro - 4,5-dihydro-5-phenyl-1,4-benzodiazepin-2(1H)-one used as a starting material above is not a part of the present invention but its preparation is disclosed hereinbelow in order that the present disclosure may be complete.

10.8 g. of 7 - chloro - 5 - phenyl-3H-1,4-benzodiazepin-2(1H)-one were dissolved in 120 ml. of glacial acetic acid and hydrogenated in the presence of 1.2 g. of platinum oxide at room temperature and atmospheric pressure. Absorption of hydrogen stopped after the absorption of one mol (one hour). The mixture was filtered, the filtrate was concentrated in vacuo and the residue was crystallized from dilute dimethylformamide. The pure product, 7-chloro - 5 - phenyl - 4,5 - dihydro - 3H - 1,4-benzodiazepin-2(1H)-one, melted at 184.5–185.5°.

Example 5

To 1.5 g. of lithium aluminum hydride in 100 cc. of anhydrous ether was added 4.7 g. of 5-phenyl-3H-1,4-benzodiazepin-2(1H)-one. The reaction mixture was stirred at room temperature for 1 hour, refluxed for 5 hours and then cooled. Wet ether was added and the mixture was filtered over hyflo. The filtrate was dried and concentrated in vacuo to dryness. The oily residue crystallized from a mixture of ether and petroleum ether yielding 5-phenyl-1,2-dihydro-3H-1,4-benzodiazepine which on crystallization from petroleum ether formed yellow needles melting at 145–7°.

5 - phenyl - 3H - 1,4-benzodiazepin-2(1H)-one used as a starting material above is not a part of the present invention but its preparation is disclosed hereinbelow in order that the present disclosure may be complete.

A mixture of 16.8 g. of 2-aminobenzophenone, 11.9 g. of glycine ethyl ester hydrochloride and 200 ml. of pyridine was heated to reflux. After one hour, 20 ml. of pyridine were distilled off. The solution was refluxed for 15 hours, then 11.9 g. of glycine ethyl ester hydrochloride were added and the refluxing was continued for an additional 4 hours. The reaction mixture was concentrated in vacuo, then diluted with ether and water. The reaction product, 5-phenyl-3H-1,4-benzodiazepin-2(1H)-one, crystallized out, was filtered off and then recrystallized from acetone in the form of colorless rhombic prisms, M.P. 182–183°.

Example 6

9.5 g. of 7-chloro-5-(2-chlorophenyl)-3H-1,4-benzodiazepin-2(1H)-one contained in a Soxhlet extractor was slowly eluted, by extraction with refluxing ether, into a boiling solution containing 2.5 g. of lithium aluminum hydride in 500 ml. of absolute ether. After 22 hours all starting material was dissolved and a yellow precipitate was formed. The excess of lithium aluminum hydride was destroyed by the cautious addition of 10 ml. of water, and the resulting mixture was dried with a large amount of sodium sulfate and filtered. The ether solution on concentration and addition of petroleum ether yielded yellow crystals of 7-chloro-5-(2-chlorophenyl)-1,2-dihydro-3H-1,4-benzodiazepine which after recrystallization from a mixture of benzene and petroleum ether melted at 175–177°.

7 - chloro - 5 - (2-chlorophenyl)-3H-1,4-benzodiazepin-2(1H)-one used as a starting material above is not a part of the present invention but its preparation is disclosed hereinbelow in order that the present disclosure may be complete.

o-Chlorobenzoylchloride (600 g.) was heated to 110° in a 5 l. three-necked flask equipped with thermometer, mechanical stirrer, and reflux condenser. To this p-chloroanilin (175 g.) was added under stirring. The mixture was then heated to 180° and zinc chloride (230 g.) was added. The temperature now was gradually raised to 220–230° and kept there until the HCl evolution had ceased (1–2 hours). After cooling to 120°, water was cautiously added and the mixture heated to reflux. The hot water layer was decanted and this procedure repeated 2 or 3 times.

The water insoluble brown mass was finally suspended in a mixture of 350 ml. water, 500 ml. acetic acid and 650 ml. concentrated sulfuric acid and heated to reflux for 17 hours. After cooling, the homogeneous dark solution was poured into ice water, the mixture extracted with ether, the ether extract was neutralized with 2 N sodium hydroxide. Concentration of the ether solution and addition of a small amount of petroleum ether yielded 2-amino-2',5-dichlorobenzophenone in yellow crystals, which after recrystallization from ether petroleum ether yielded the pure compound, M.P. 88–89°.

2-amino-2',5-dichlorobenzophenone (112 g.) was dissolved in a solution containing glycine ethyl ester hydrochloride (180 g.) in pyridine (500 ml.) and piperidine (5 ml.). After refluxing for 18 hours, the solvents were evaporated, the residue taken up in ether and the ether extract washed with water. The ether phase was repeatedly extracted with 2 N HCl thus separating the salt of the reaction product from the unreacted ketone which remains in the ether. The acidic aqueous solution was neutralized and extracted with ether to yield 7-chloro-5-(2-chlorophenyl) - 3H-1,4-benzodiazepin-2(1H)-one. After recrystallization from methanol the product forms crystals melting at 199–201°.

Example 7

10 g. of 7-chloro-5-(2-chlorophenyl)-1-methyl-3H1,4-benzodiazepin-2(1H)-one contained in a Soxhlet extractor was slowly eluted, by extraction with refluxing ether, into a boiling solution containing 2.5 g. of lithium aluminum hydride in 500 ml. of absolute ether. After 18 hours all starting material was dissolved and a pink solution was formed. The excess of lithium aluminum hydride was destroyed by the cautious addition of a small amount of water and the resulting mixture was dried with sodium sulfate and filtered. The ether solution, on concentration and addition of petroleum ether, yielded colorless prisms 7 - chloro - 5 - (2 - chlorophenyl) - 1 - methyl - 1,2,4,5,-tetrahydro-3H-1,4-benzodiazepine which after recrystallization from a mixture of benzene and petroleum ether melted at 133–135°.

7 - chloro - 5 - (2 - chlorophenyl) - 1 - methyl - 3H - 1,4-benzodiazepin-2(1H)-one used as a starting material above is not a part of the present invention, but its preparation is disclosed hereinbelow in order that the present disclosure may be complete.

7 - chloro - 5 - (2 - chlorophenyl) - 3H - 1,4 - benzodiazepin-2(1H)-one (15.2 g.) was dissolved in methanol (250 ml.) and a 1 N solution of sodium methoxylate (50 ml.) added. The solvent was removed in vacuo; the residue dissolved in dimethylformamide (50 ml.) and methyliodide (10 ml.) added. In a spontaneous reaction the temperature of the solution rose to 50°. After 30 minutes the main amount of the solvent was evaporated in vacuo, the residue poured into water and extracted with ether. From this ether solution crystals were isolated which after recrystallization from methanol yielded 1 - methyl - 7 - chloro - 5 - (2 - chlorophenyl) - 3H - 1,4-benzodiazepin-2(1H)-one, M.P. 135–138°.

Example 8

5 g. of 7-chloro-4,5-dihydro-5-(2-chlorophenyl)-1-methyl-3H-1,4-benzodiazepin-2(1H)-one contained in a Soxhlet extractor was slowly eluted, by extracting with refluxing ether, into a boiling solution of 1.19 g. of lithium aluminum hydride in 350 ml. of ether. After refluxing for 22 hours the excess of lithium aluminum hydride was destroyed by the addition of 10 ml. of water. The emulsion was dried with sodium sulfate, filtered and concentrated. The residue was crystallized by the addition of petroleum ether, and the product then recrystallized from a mixture of benzene and petroleum ether to form prisms of 7 - chloro - 5 - (2 - chlorophenyl) - 1 - methyl - 1,2,4,5-tetrahydro-3H-1,4-benzodiazepine melting at 133–135°.

7 - chloro - 4,5 - dihydro - 5 - (2 - chlorophenyl) - 1-methyl-3H-1,4-benzodiazepin-2(1H)-one used as a starting material above is not a part of the present invention but its preparation is disclosed hereinbelow in order that the present disclosure may be complete.

11.5 g. of 7-chloro-5-(2-chlorophenyl)-1-methyl-3H-1,4-benzodiazepin-2(1H)-one was dissolved in 200 ml. acetic acid and after the addition of 0.5 g. of $PtO_2$ shaken in a hydrogen atmosphere (1 atm., 25°). After the uptake of 1050 ml. hydrogen the catalyst was filtered off, the solvent evaporated, the residue treated with a sodium hydroxide solution and filtered. Crystals of 7-chloro-4,5-dihydro - 5 - (2 - chlorophenyl) - 1 - methyl - 3H - 1,4-benzodiazepin-2(1H)-one were obtained which after several recrystallizations from alcohol and ether melted at 168–171°.

Example 9

A solution of 7-chloro-1-methyl-5-phenyl-3H-1,4-benzodiazepin-2(1H)-one (57.0 gm.) in anhydrous tetrahydrofuran (500 ml., distilled over lithium aluminum hydride and freshly filtered through activated alumina) was added dropwise over 2 hours to a stirred, refluxing suspension of lithium aluminum hydride (15.2 gm.) in anhydrous tetrahydrofuran (500 ml.). After the addition was complete, stirring and refluxing were continued for a further 3 hours and the mixture was then cooled in an ice bath and treated dropwise with excess saturated aqueous sodium sulfate solution, followed by anhydrous sodium sulfate to dry the products. The inorganic salts were filtered off, washed thoroughly with ether, and the filtrates were evaporated yielding the crude product as a gum. This was dissolved in ether and the basic material was extracted into ice cold 1 N hydrochloric acid. The acid extract was cooled with ice and basified with 3 N sodium hydroxide solution, resulting in precipitation of the product. The precipitate was extracted into ether, the extract was washed with water, dried over magnesium sulfate and evaporated, yielding 7-chloro-1-methyl-5-phenyl-1,2,4,5-tetrahydro-3H-1,4-benzodiazepine as a pale brown gum. This material was converted to the hydrochloride by addition of 2 N hydrochloric acid in methanol (1.05 equivalents), followed by ether and petroleum ether to precipitate the hydrochloride. The latter was further purified by washing it with benzene and upon recrystallization from methanol-ether-petroleum ether formed pale yellow plates. This material was converted to the free base by treatment with ice cold dilute sodium hydroxide solution and extraction with ether. Evaporation of the ether extract yielded a pale yellow gum which was readily crystallized from pentane at −70°. Further recrystallizations from pentane yielded pale yellow needles of 7-chloro-1-methyl - 5 - phenyl - 1,2,4,5 - tetrahydro - 3H - 1,4-benzodiazepine melting at 60–62°.

The base was reconverted into the hydrochloride by treatment with methanolic hydrochloric acid, followed by the addition of ether and petroleum ether, as previously. After further recrystallizations from methanol-ether it formed colorless needles, M.P. 258–259°.

Also the base was converted to the monopicrate by treatment of a solution of the base in ether with an ethereal solution of picric acid (1 equivalent). The resulting crystalline picrate was further recrystallized from acetone-hexane and then from ethanol, yielding bright yellow prisms, M.P. 202–204°.

7 - chloro - 1 - methyl - 5 - phenyl - 3H - 1,4-benzodiazepin-2(1H)-one used as a starting material above is not a part of the present invention, but its preparation is disclosed below in order that the present disclosure may be complete.

1.08 g. of sodium methoxide were added to a solution of 5.4 g. of 7 - chloro - 5-phenyl-3H-1,4-benzodiazepin-2(1H)-one in 300 ml. of benzene. 100 ml. of benzene were distilled off in order to remove the liberated methanol, then 1.9 ml. of dimethylsulfate were added. The solution was refluxed from one hour, then washed with water, dried over sodium sulfate, filtered and concentrated in vacuo. The residue, 7-chloro-1-methyl-5-phenyl - 3H - 1,4 - benzodiazepin-2(1H)-one, was crystallized from a mixture of ether and petroleum ether, M.P. 125–126°.

Example 10

20 g. of 7 - chloro - 5 - phenyl-3H-1,4-benzodiazepin-2(1H)-thione in 500 ml. of acetone was treated with washed Raney nickel (20 tsp., approximately 60 g.) and heated under reflux for two hours. The washed Raney neckel was obtained by washing Raney nickel (activity about $W_2$) thoroughly with water until the washings were neutral, then with ethanol and finally with acetone. The reaction mixture obtained above was cooled, the Raney nickel filtered off and then washed with ethanol.

The combined filtrates were evaporated, the residue dissolved in methylene chloride and the resulting solution washed with water, dried over magnesium sulfate and evaporated to yield a residue which was then dissolved in ether. The resulting ether solution was extracted with ice cold 1 N hydrochloric acid solution and this aqueous solution then treated with dilute sodium hydroxide causing precipitation. The product was extracted into ether, the extract washed with water until neutral, dried over magnesium sulfate and evaporated to give a brown gum. This was then dissolved in methanol and 2 N hydrochloric acid in methanol (1.1 equivalents) added thereto. Ether and petroleum ether were added causing the precipitation of the hydrochloride of the reaction product. The hydrochloride was reconverted to free base by treatment with cold dilute sodium hydroxide solution and extraction of the free base into ether. The extracts, after washing with water and drying over magnesium sulfate yielded the base on evaporation. The so-obtained crude product was recrystallized from methylene chloride-hexane and then from aqueous ethanol, forming yellow plates of 7 - chloro-5-phenyl-1,2-dihydro-3H-1,4-benzodiazepine.

7 - chloro - 5 - phenyl - 3H - 1,4 - benzodiazepin - 2(1H)-thione, used as a starting material above, is not a part of the present invention but its preparation is disclosed hereinbelow in order that the present disclosure may be complete.

A solution of 7-chloro-5-phenyl-3H-1,4-benzodiazepin-2(1H)-one (271 gm.) in anhydrous pyridine (2 l., freshly distilled from barium oxide) was treated with phosphorus pentasulfide (242 gm.) and stirred and heated under reflux for 0.5 hour, with protection from atmospheric moisture. The reaction mixture was then immediately chilled in an ice-bath, the dark colored pyridine solution transferred to a separating funnel and added slowly to a well-stirred solution of sodium chloride (1500 gm.) in water (5 l.) while maintaining the temperature of the mixture at <10° by ice-cooling. The crude product precipitated as a dark brown amorphous solid which was collected, washed with water and dried at 80°. This material was recrystallized from each of nitrobenzene-benzene-petroleum ether, ethanol and aqueous acetone. In an alternative method of purification, the crude product was dissolved in methylene chloride (4–5 l.) and the resulting solution filtered through a short chromatography column containing "Woelm" neutral alumina, activity III (1 kg.); concentration of the filtrates and dilution with petroleum ether then gave crystalline product. Further recrystallization from ethanol gave pale yellow prisms of 7 - chloro - 5 - phenyl-3H-1,4-benzodiazepin-2-(1H)-thione melting at 244–246°.

In an alternative method of preparation, anhydrous xylene (2 l.) was used as solvent instead of pyridine, and refluxing of the reaction mixture was continued for 2 hours. After cooling the mixture, the crude product was recovered by filtration and was purified by dissolution in dilute sodium hydroxide solution and reprecipitation by neutralization with hydrochloric acid. Further purification by chromatography over alumina, as previously, then gave an impure crystalline product. This material required several more recrystallizations for complete purification.

*Example 11*

20 g. of 7-chloro-1-methyl-5-phenyl-3H-1,4-benzodiazepin-2(1H)-thione in 500 ml. of acetone was treated with 20 tsp. (app. 60 g.) of the washed Raney nickel described above in Example 10, and the resulting mixture heated under reflux for two hours. The reaction mixture was then cooled and the Raney nickel filtered off and washed with ethanol. The combined filtrates were evaporated, the residue dissolved in methylene chloride, the resulting solution washed with water, dried over magnesium sulfate and evaporated. The residue was then dissolved in ether, the basic product extracted into ice cold 1 N hydrochloric acid solution and then reprecipitated by the basification of the aqueous solution with diluted sodium hydroxide solution. The product was extracted into ether, the extract washed with water until neutral, dried over magnesium sulfate and evaporated. The residue was then dissolved in methanol and 2 N hydrochloric acid in methanol (1.1 equivalents) added thereto. Ether and petroleum ether were then added causing the precipitation of 7-chloro-1-methyl-5-phenyl-1,2-dihydro-3H-1,4-benzodiazepine hydrochloride as orange needles. The hydrochloride was reconverted to the free base by treatment with cold dilute sodium hydroxide solution and extraction of the free base into ether. The extracts were washed with water, dried over magnesium sulfate, and evaporated yielding the free base which upon being recrystallized several times from pentane at −70° gave very pale yellow prisms melting at 95–97°.

The base was reconverted to the corresponding hydrochloride by treatment with methanolic hydrochloric acid followed by precipitation of the hydrochloride by addition of ether and petroleum ether. The hydrochloride so obtained, upon recrystallization from a mixture of methanol and ether, formed orange needles melting at 259–260°.

7 - chloro - 1 - methyl - 5-phenyl-3H-1,4-benzodiazepin-2(1H)-thione, used as a starting material above, is not a part of the present invention but its preparation is disclosed hereinbelow in order that the present disclosure may be complete.

A solution of 7-chloro-1-methyl-5-phenyl-3H-1,4-benzodiazepin-2(1H)-one (14.3 gm.) in anhydrous pyridine (100 ml.) was treated with phosphorus pentasulfide (11.1 gm.) and stirred and heated under reflux for 0.75 hour, with protection from atmospheric moisture. The pyridine was distilled off in vacuo, the tarry residue was dissolved in methylene chloride and the solution filtered through a short chromatography column containing "Woelm" neutral alumina, activity III (200 gm.). Concentration of the filtrates and addition of petroleum ether gave as a crude product 7 - chloro-1-methyl-5-phenyl-3H-1,4-benzodiazepin-2(1H)-thione, which upon recrystallization from benzene-hexane and then from ethanol formed pale yellow prisms melting at 156–157°.

*Example 12*

Washed Raney nickel was obtained as described above in example 10. A mixture of 500 ml. of acetone and 20 g. of 7 - chloro - 5-(2-chlorophenyl)-3H-1,4-benzodiazepin-2(1H)-thione was treated with 20 tsp. (app. 60 g.) of the washed Raney nickel, then heated under reflux for two hours, cooled and the Raney nickel filtered off and washed with ethanol. The resulting filtrates were combined and evaporated, yielding a residue which was dissolved in methylene chloride. The resulting solution was washed with water, dried over magnesium sulfate, and evaporated. The so-obtained residue was then dissolved in ether and the resulting solution extracted with ice cold 1 N hydrochloric acid solution and the resulting aqueous solution then treated with dilute sodium hydroxide solution causing precipitation. The product was extracted into ether, the extract washed with water until neutral, dried over magnesium sulfate, and evaporated to give a brown gum. This was dissolved in methanol and 2 N hydrochloric acid in methanol (1.1 equivalents) added to the resulting solution, and precipitation effected by the addition of ether and petroleum ether. This yielded the hydrochloride of the reaction product, i.e. 7-chloro-5-(2-chlorophenyl)-1,2-dihydro-3H-1,4-benzodiazepine hydrochloride, which was reconverted to the free base by treatment with cold dilute sodium hydroxide solution and extraction of the free base into ether. The extracts, after washing with water and drying over magnesium sulfate, yielded the base on evaporation. The latter was recrystallized from benzene-hexane and formed pale yellow prisms, M.P. 174–175°.

7 - chloro - 5 - (2-chlorophenyl)-3H-1,4-benzodiazepin-2(1H)-thione, used as a starting material above is not a part of the present invention but its preparation is hereinbelow disclosed in order that the present disclosure may be complete.

A solution of 7 - chloro-5-(2-chlorophenyl)-3H-1,4-benzodiazepin-2(1H)-one (30.5 gm.) in anhydrous pyridine (200 ml.) was treated with phosphorus pentasulfide (24.2 gm.) and stirred and heated under reflux for 0.5 hour, with protection from atmospheric moisture. The reaction mixture was then immediately chilled in an ice-bath, the dark colored pyridine solution transferred to a separating funnel and added slowly to a well-stirred solution of sodium chloride (150 g.) in water (.5 l.) while maintaining the temperature of the mixture at <10° by ice cooling. The product precipitated as an oil. This was extracted into methylene chloride, the extract was washed with water, dried over magnesium sulfate and evaporated in vacuo to remove solvent and remaining pyridine. The tarry residue was dissolved in methylene chloride and the solution was filtered through a short chromatography column containing "Woelm" neutral alumina, activity III (500 gm.). Concentration of the filtrates and addition of petroleum ether gave a crystalline product which upon further crystallization from ethanol gave pale yellow needles of 7-chloro-5-(2-chlorophenyl)-3H-1,4-benzodiazepin-2(1H)-thione melting at 251–253°.

Example 13

To a suspension of 2.5 g. of lithium aluminum hydride in 1000 ml. of absolute ether 10 g. of 7-chloro-5-(2-chlorophenyl) - 4,5 - dihydro - 3H-1,4-benzodiazepin-2(1H)-one was added and the mixture refluxed for 21 hours. After the dropwise addition of 50 ml. of water to the stirred and cooled suspension, the ether solution was dried with sodium sulfate and filtered. The ether was evaporated and the residue treated with 50 ml. of a 16% solution of hydrogen chloride in ethanol. The solvent was removed in vacuo on a steam bath and the residue dissolved in ethanol and the solvent evaporated again as above in order to remove the excess of hydrogen chloride. The residue was recrystallized three times from a mixture of ethanol and ether yielding 7-chloro-5(2-chlorophenyl)1,2,4,5-tetrahydro-3H-1,4-benzodiazepine hydrochloride as white needles which melted at 275–280° under decomposition.

Example 14

A solution of 2.3 g. of 2-amino-5-chlorobenzophenone and 2.3 g. of β-bromoethylbenzamide in 25 ml. of dimethyl formamide was heated on a steambath for 16 hours, diluted with water and extracted with methylene chloride. The organic layer was dried and concentrated in vacuo to dryness and the residue then crystallized from a mixture of ether and petroleum ether yielding crude reaction product. This was crystallized from a mixture of acetone, petroleum ether and formed yellow needles of N - [2 - (4 - chloro - 2 - benzoylanilino)ethyl]benzamide melting at 143–4°.

Example 15

A solution of 1.1 g. of N-[2-(4-chloro-2-benzoylaniline)ethyl]benzamide in a mixture of 15 ml. of concentrated hydrochloric acid and 10 ml. of ethanol was heated on the steambath for 56 hours. The reaction mixture was diluted with water and extracted with methylene chloride. The aqueous layer was made alkaline with 3 N potassium hydroxide and extracted with methylene chloride. The resulting organic layer was dried and concentrated in vacuo to dryness. The residue was crystallized from ether yielding 7-chloro-5-phenyl-1,2-dihydro-3H-1,4-benzodiazepine.

Example 16

A solution of 2.3 g. of 2-amino-5-chlorobenzophenone and 2.5 g. of β-bromoethylphthalimide in 30 ml. of dimethylformamide was refluxed for 16 hours, diluted with water and extracted with methylene chloride. The organic layer was dried and concentrated in vacuo to dryness. The residue was crystallized from ether yielding crude reaction product which was crystallized from ether and formed yellow crystals of N-[2-(4-chloro-2-benzoylanilino)ethyl]phthalimide melting at 171–3°.

Example 17

To 30 ml. of 70% sulfuric acid heated to 135° was added 1 g. of N-[2-(4-chloro-2-benzoylanilino)ethyl]phthalimide. The temperature was raised to 179°; after ½ hour the solution was poured over ice and extracted with methylene chloride. The aqueous layer was made alkaline with 40% potassium hydroxide and extracted with methylene chloride. The resulting organic layer was dried and concentrated in vacuo to dryness. The residue was crystallized from ether yielding 7-chloro-5-phenyl-1,2-dihydro-3H-1,4-benzodiazepine.

Example 18

A solution of 5.0 g. of 7-chloro-1,4-dimethyl-4,5-dihydro-5-phenyl-3H-1,4-benzodiazepin-2(1H)-one in 100 ml. of ether was treated with 0.95 g. of lithium aluminum hydride and the resulting mixture stirred under reflux for three hours. Excess lithium aluminum hydride was then destroyed by the addition of a 1:1 mixture of ether and ethyl acetate. A saturated solution of potassium bicarbonate in water was added until the resultant gray solid coagulated. This was filtered off and washed thoroughly with ether. The ether washings and filtrates were combined, washed with 50 ml. of water and dried over anhydrous sodium sulfate. Filtration and removal of the solvent gave a pale yellow oil which was dissolved in a small amount of methanol and the resulting solution was treated with an excess of methanolic hydrochloric acid solution. The solvent was removed under reduced pressure and the residual hydrochloride recrystallized twice from acetone yielding white prisms of 7-chloro-1,4-dimethyl - 1,2,4,5 - tetrahydro - 5 - phenyl - 3H-1,4-benzodiazepine hydrochloride melting at 225–228°.

A small amount of the above hydrochloride was dissolved in water, the resulting solution made alkaline with ammonium hydroxide and the base extracted into methylene chloride. The methylene chloride solution was washed alkali free with water, dried over anhydrous sodium sulfate, filtered, and the solvent removed. The residue was recrystallized from ethanol yielding 7-chloro-1,4-dimethyl-1,2,4,5-tetrahydro - 5 - phenyl-3H-1,4-benzodiazepine as white prisms melting at 79–80°.

7-chloro-1,4-dimethyl - 4,5 - dihydro-5-phenyl-3H-1,4-benzodiazepin-2(1H)-one used above as a starting material is not a part of the present invention, but its preparation is disclosed herein below in order that the present disclosure may be complete.

24 g. of 7-chloro-4,5-dihydro - 5 - phenyl-3H-1,4-benzodiazepin-2(1H)-one was placed in a 500 ml., three-necked round-bottomed flask fitted with a stirrer and a reflux condenser; the compound was then dissolved in 100 ml. of N,N-dimethylformamide, and the sodio derivative prepared by warming and stirring the resulting solution with 23.9 ml. of a solution of sodium methoxide in methanol (0.0044 m./ml.) for one hour. 125.4 g. of methyl iodide was then added, and the resulting solution stirred for one hour at room temperature and then seven hours at about 50°. The solvent was distilled off under reduced pressure and the residue dissolved in 250 ml. of methylene chloride. This solution was washed with 150 ml. of water, 150 ml. of 3 N hydrochloric acid, 150 ml. of water, and 3 times with 50 ml. of saturated brine solution. The methylene chloride solution was then dried over anhydrous sodium sulfate, the solvent removed, and the residual oil taken up in 200 ml. of ether. The ether solution was then filtered through a layer of 50 g. of grade I, neutral alumina (Woelm), which was thoroughly eluted with ether until the ether washings were colorless. The ether fractions were then combined and the solvent removed, yielding a pale yellow oil which was crystallized and recrystallized from hexane to yield 7-chloro-1,4-dimethyl-4,5-dihydro-5-phenyl-3H-1,4-benzodiazepin-2(1H)-one melting at 90–91°.

*Example 19*

7-chloro-1-methyl-5-phenyl-1,2,4,5-tetrahydro-3H-1,4-benzodiazepine (2.00 g.) was dissolved in cold methyl iodide (9.1 g.) and kept for 3 days at room temperature. The excess methyl iodide was evaporated in vacuo, at 20°, and the resulting product dissolved in methylene chloride. The solution was washed with dilute aqueous sodium hydroxide solution, followed by water until neutral, and then evaporated, yielding 7-chloro-1,4-dimethyl-1,2,4,5-tetrahydro-5-phenyl-3H-1,4-benzodiazepine as a pale brown gum.

This base was purified by dissolving it in 1 N hydrochloric acid and extracting the resultant solution with ether to remove non-basic materials. The acid aqueous layer was then made basic with dilute sodium hydroxide solution, and the precipitated product was extracted into methylene chloride. The extract was washed with water until neutral, dried over magnesium sulfate and evaporated, yielding the purified base as a pale yellow gum. This was converted to the corresponding hydrochloride by dissolving it in methanol, adding 2 N-methanolic hydrochloric acid (1.1 equivalents), followed by precipitation of the hydrochloride by addition of ether and petroleum ether.

*Example 20*

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

60 g. of 2-chloro-5-trifluoromethylbenzophenone imine hydrochloride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40° (corr.).

The above mentioned 2-chloro-trifluoromethylbenzophenone is not a part of this invention but intermediates therefor and the processes for making same have been herein set forth in order that the present disclosure may be complete.

2-chloro-5-trifluoromethylbenzophenone (82.1 g.) was dissolved in anhydrous pyridine (300 ml.) and the solution treated with ethylenediamine (100 ml., 89.9 g.). The mixture was stirred and refluxed during 5 hours under dry conditions, then allowed to cool overnight. The solution was evaporated in vacuo and the residue dissolved in 0.6 N hydrochloric acid (500 ml.) and extracted with ether. The aqueous layer was cooled in an ice bath and made basic with 3 N sodium hydroxide solution. The resulting suspension was extracted with ether, the extract was washed with water, dried over anhydrous magnesium sulfate, and evaporated to give the product as a pale yellow gum which rapidly crystallized. This material was recrystallized from hexane, giving yellow needles of 7-trifluoromethyl-5-phenyl-1,2-dihydro-3H-1,4-benzodiazepine. Two further recrystallizations from hexane yielded pale yellow needles melting at 110–111.

7-trifluoromethyl-5-phenyl-1,2-dihydro-3H-1,4-benzodiazepine (29.4 g.) was dissolved in methanol (56 ml.) and the solution was treated with 2 N hydrochloric acid in methanol (56 ml.), cooling the stirred mixture in an ice bath during addition of the acid solution. The mixture was then evaporated at 25° and the residue was dried by azeotropic distillation with anhydrous benzene. The residue was then triturated with benzene and the crystalline product filtered off, washed with ether and dried at 60° in vacuo to give the crude 7-trifluoromethyl-5-phenyl-1,2-dihydro-3H-1,4-benzodiazepine hydrochloride as yellow crystals. Recrystallization from methanol/ether yielded bright yellow prisms melting at 283–285°.

*Example 21*

A solution of 208 g. of 2-chloro-5-nitrobenzophenone in a mixture of 500 ml. of pyridine and 200 ml. of ethylenediamine was refluxed for 5 hours. Some solvent was distilled off at atmospheric pressure, then the reaction mixture was concentrated in vacuo to dryness. Methanol was added to the residue and the crude reaction product filtered off. Additional reaction product was obtained from the filtrate as follows: It was concentrated to dryness and the residue was dissolved in a mixture of methylene chloride and water. The organic layer was separated, dried and concentrated to a small volume yielding the above mentioned second crop.

The reaction product was recrystallized from acetone and formed yellow needles of 7-nitro-5-phenyl-1,2-dihydro-3H-1,4-benzodiazepine melting at 211–212°.

To a solution of 160 g. of 7-nitro-5-phenyl-1,2-dihydro-3H-1,4-benzodiazepine in 1.6 liters of dimethylformamide was added 35.6 g. of sodium methoxide and the resulting mixture was stirred at room temperature for one hour. Then 62.5 ml. of dimethyl sulfate was added and the stirring continued for 2 more hours. Water was then added to the reaction mixture and crude product filtered off.

Upon recrystallization from a mixture of methylene chloride and ether, 1-methyl-7-nitro-5-phenyl-1,2-dihydro-3H-1,4-benzodiazepine was obtained as yellow prisms melting at 187–188°.

*Example 22*

A mixture of ortho-fluorobenzophenone (10 g.) and ethylenediamine (50 ml.) was refluxed for two hours. Ice (400 g.) was added to the hot solution and the precipitated oil extracted into methylene chloride (3 x 50 ml.). The organic layers were combined, washed with water (3 x 50 ml.) and the base extracted into 1 N hydrochloric acid (3 x 75 ml.). The orange solution of the hydrochloride was washed with methylene chloride (2 x 50 ml.) and the base then precipitated by neutralizing with 30% sodium carbonate solution. The base was then extracted into methylene chloride (3 x 50 ml.), the organic layers combined, dried over anhydrous sodium sulfate and filtered. Removal of the solvent and recrystallization of the residue from hexane gave 5-phenyl-1,2-dihydro-3H-1,4-benzodiazepine, as pale yellow needles melting at 144–146°.

*Example 23*

A solution of 4 g. of 2-chlorobenzophenone in 40 ml. of ethylenediamine was refluxed for 17 hours. The cooled mixture was poured into 300 ml. of ice water and extracted with ether. The ether was evaporated and the residue was refluxed for 3 hours in a mixture of 20 ml. of ethanol and 40 ml. of 20% hydrochloric acid. The main amount of ethanol was removed in vacuo and the aqueous phase was extracted with ether. The aqueous phase was made alkaline with sodium hydroxide and extracted with ether. After washing with water and drying with sodium sulfate, the ether was evaporated and the residue consisting mainly of 2-($\beta$-aminoethylamino)-benzophenone was cyclized by refluxing for 16 hours in 50 ml. of pyridine containing 0.5 g. of pyridinium hydrochloride. The pyridine was removed in vacuo and the residue partitioned between ether and 2 N sodium hydroxide. The ether layer was washed with water, dried with sodium sulfate and concentrated. Faintly yellow leaflets of 1,2-dihydro-5-phenyl-3H-1,4-benzodiazepine were obtained which after recrystallization from ether melted at 140–142°.

*Example 24*

A solution of 4 g. of 2,5-dichlorobenzophenone in 50 ml. of ethylenediamine was refluxed for 17 hours. The cooled mixture was poured into 500 ml. of ice water and extracted with ether. The ether was evaporated and the residue refluxed for 5 hours in a mixture of 25 ml. of ethanol and 50 ml. of 20% hydrochloric acid. The main amount of alcohol was removed in vacuo and the aqueous phase was extracted with ether. The aqueous phase was made alkaline with sodium hydroxide and extracted with ether. After washing with water and drying with sodium sulfate the ether was evaporated and the residue consisting mainly of 2-($\beta$-aminoethylamino)-5-chlorobenzophenone was cyclized by refluxing for 17 hours in 30 ml. of pyridine containing 0.5 g. of pyridinium hydrochloride. The pyridine was removed in vacuo and the residue partitioned between ether and 2 N sodium hydroxide. The ether layer was washed with water, dried with sodium sulfate and concentrated. Yellow prisms of 7-chloro-1,2-dihydro-5-phenyl-3H-1,4-benzodiazepine were obtained which after recrystallization from ether melted at 170–171°.

*Example 25*

8 g. of 5-(2-chlorophenyl)-3H-1,4-benzodiazepin-2(1H)-one contained in a Soxhlet extractor was slowly extracted into a boiling solution of 5.7 g. of lithium aluminum hydride in 500 ml. of ether. After 20 hours the solution was cooled and the excess of lithium aluminum hydride was destroyed by addition of ethyl acetate and water. After drying with sodium sulfate, the solvent was removed and the crystalline residue was recrystallized from benzene yielding yellow platelets of 5-(2-chlorophenyl)-1,2-dihydro-3H-1,4-bensodiazepine melting at 165–167°.

The above-mentioned 5-(2-chlorophenyl)-3H-1,4-benzodiazepin-2(1H)-one, its preparation and intermediates therefor are not a part of this invention but such are disclosed hereinbelow in order that the present disclosure may be complete.

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

To a solution of 42 g. of 2-amino-2'-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl)-acetanilide melting at 119–121°.

To a solution of 14.5 g. of 2-bromo-2'-(2-chlorobenzoyl)-acetanilide in 100 ml. of tetrahydrofuran, an excess of liquid ammonia (ca. 150 ml.) was added. The ammonia was kept refluxing with a Dry-Ice condenser for 3 hours after which time the ammonia was allowed to evaporate and the solution was poured into water. Crystals of 2-amino-2'-(2-chlorobenzoyl)-acetanilide were collected, which after recrystallization from ethanol melted at 162–164°.

A solution of 3 g. of 2-amino-2'-(2-chlorobenzoyl)-acetanilide in 50 ml. of pyridine was refluxed for 24 hours after which time the pyridine was removed in vacuo. The residue was recrystallized from methanol and a mixture of dichloromethane and ether giving crystals of 5-(2-chlorophenyl)-3H-1,4-benzodiazepin-2(1H)-one melting at 212–213°.

*Example 26*

0.9 g. of lithium aluminum hydride was added to a solution of 5.0 g. of 7-chloro-1,4-dimethyl-5-(2-fluorophenyl) - 1,2,4,5 - tetrahydro - 3H - 1,4 - benzodiazepin-2(1H)-one in 50 cc. of anhydrous ether, and the mixture stirred under reflux for 3 hours. Excess lithium aluminum hydride was then destroyed by the addition of a 1:1 mixture of ether and ethyl acetate. A saturated solution of potassium bicarbonate was added until a solid coagulated. This was filtered and washed thoroughly with ether. The ether washings and filtrate were combined, washed with 50 cc. of water and dried over anhydrous sodium sulfate. Filtration and removal of the solvent, yielded an oil which was dissolved in a small volume of methanol. The solvent was removed under reduced pressure, and the residue recrystallized from methanol yielding colorless prisms of 7-chloro-1,4-dimethyl-5-(2-fluorophenyl)-1,2,4,5-tetrahydro-3H-1,4-benzodiazepine, melting at 68–70°.

The above-mentioned 7-chloro-1,4-dimethyl-5-(2-fluorophenyl)-1,2,4,5-tetrahydro-3H-1,4-benzodiazepin - 2(1H) - one, its preparation and intermediates therefor are not a part of this invention but such are disclosed hereinbelow in order that the present disclosure may be complete.

A mixture of 176 g. of fluoro benzoyl chloride and 64 g. of chloroaniline was stirred and heated to 180°, at which temperature 87 g. of zinc chloride was introduced, the temperature raised to 200–205° and maintained there for forty minutes. The golden colored melt was quenched by the careful addition of 500 ml. of 3 N hydrochloric acid and the resulting mixture refluxed for five minutes. The acid solution was decanted and the process repeated three times to remove all fluorobenzoic acid. The grey granular residue was dissolved in 300 ml. of 75% (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of chloroaniline, three 500 ml. portions of 5 N sodium hydroxide solution to remove fluorobenzoic acid, and finally two 200 ml. portions of saturated brine solution. The methylene chloride extract was dried over anhydrous sodium sulphate and the solvent removed to give the crude aminobenzophenone. Recrystallization from ethanol gave 2-amino-5-chloro-2'-fluorobenzophenone as yellow needles, M.P. 94–95°.

A mixture of 20 g. of 2-amino-5-chloro-2'-fluorobenzophenone and 35 g. of glycine ethyl ester hydrochloride was refluxed in 200 ml. of pyridine, containing 0.5 ml. of piperidine, for eighteen hours. The mixture was distilled until 100 ml. of pyridine had been collected, and the residue poured into water. The remaining pyridine was neutralized with dilute hydrochloric acid and the product extracted with two 100 ml. portions of methylene chloride. The extracts were combined, washed well with water and saturated brine solution, dried over anhydrous sodium sulfate, and the solvent removed under reduced pressure. The oil remaining was dissolved in acetone, treated with charcoal (Norite), filtered and recrystallized from a mixture of acetone and hexane to give 7-chloro-5-(2-fluorophenyl)-3H-1,4-benzodiazepin-2(1H) - one as white needles, M.P. 205–206°.

A solution of 5.9 g. of 7-chloro-5-(2-fluorophenyl)-3H-1,4-benzodiazepin-2(1H)-one in 60 ml. of glacial acetic acid was hydrogenated at room temperature and atmospheric pressure in the presence of 0.6 g. of platinum oxide until 0.0197 mole of hydrogen was absorbed. The mixture was then filtered, the solvent removed under reduced pressure and a crystalline product was obtained. Recrystallization from acetone gave 7-chloro-4,5-dihydro-5-(2-fluorophenyl)-3H-1,4-benzodiazepin-2(1H) - one as white needles, M.P. 214–215°.

A solution of 13 g. of 7-chloro-5-(2-fluorophenyl)-4,5-dihydro-3H-1,4-benzodiazepin-2(1H)-one in 30 ml. of N,N-dimethylformamide was stirred and refluxed for one hour with 2.7 g. of sodium methoxide (added in the form of a methanolic solution containing 4.35 mmoles of sodium methoxide per cc. of solution). The sodio derivative thus formed was treated with 20 ml. of methyl iodide and the solution refluxed for one hour. After the excess methyl iodide was distilled off, the reaction mixture was poured into 1000 ml. of water and extracted four times with 150 ml. portions of methylene chloride. The extracts were combined, treated with carbon, dried over anhydrous sodium sulfate, and filtered. Removal of the solvent and recrystallization of the residue from ether gave 7-chloro-1,4-dimethyl-5-(2-fluorophenyl)-4,5 - dihydro-3H-1,4-benzodiazepin-2(1H)-one as white needles melting at 124–125°.

*Example 27*

7-chloro-5-(3-fluorophenyl) - 3H - 1,4 - benzodiazepin-2-(1H)-one (2.3 g.) was placed in the thimble of a Soxhlet extractor mounted on a 500 ml. round bottom flask as the boiler. A solution of lithium aluminum hydride (0.6 g.) in anhydrous ether (250 ml.) was placed in the boiler and the benzodiazepinone was extracted into the reaction mixture over a period of eighteen hours. After excess lithium aluminum hydride had been decomposed by the careful addition of ethyl acetate, a saturated solution of ammonium chloride (75 ml.) was added and the coagulated solid material was filtered. The precipitate was washed with ether (2 x 50 ml.) and the combined filtrates separated. The aqueous layer was washed with ether (2 x 50 ml.) and the combined ether layers were then washed with water (75 ml.), saturated brine (2 x 25 ml.) and dried over anhydrous sodium sulfate. Hydrogen chloride was bubbled into the ethereal solution of the base, and the precipitated hydrochloride was filtered and recrystallized from a mixture of methanol and ether yielding 7-chloro-1,2,4,5-tetrahydro-5-(3-fluorophenyl) - 3H - 1,4-benzodiazepine hydrochloride as colorless prisms, M.P. 283.5–285°.

The above-mentioned 7-chloro-5-(3-fluorophenyl)-3H-1,4-benzodiazepin-2(1H)-one, its preparation and intermediates therefore are not a part of this invention but such are disclosed hereinbelow in order that the present disclosure may be complete.

A mixture of 88 g. of m-fluorobenzoyl chloride, 32 g. of p-chloroaniline and 44 g. of zinc chloride was treated as in Example 26 to yield 2-amino-5-chloro-3'-fluorobenzophenone as yellow needles, M.P. 90–91°.

A mixture of 15.9 g. of 2-amino-5-chloro-3'-fluorobenzophenone and 26.6 g. of glycine ethyl ester hydrochloride was refluxed in 100 ml. of pyridine containing 0.3 ml. of piperidine for sixteen hours. The reaction mixture was poured into 1 liter of water and extracted with methylene chloride (3 x 200 ml.). The methylene chloride extracts were combined, washed with 100 ml. portions of 1.5 N hydrochloric acid until all pyridine had been removed as the hydrochloride, and finally with two 100 ml. portions of saturated brine solution. The organic layer was dried over anhydrous sodium sulfate and the solvent removed. The residue was recrystallized from acetone to give 7-chloro-5-(3-fluorophenyl)-3H - 1,4-benzodiazepin-2(1H)-one as white prisms, M.P. 200–201°.

*Example 28*

A solution of 5.2 g. of 5-(4-chlorophenyl)-1-methyl-3H-1,4-benzodiazepin-2(1H)-thione in 100 ml. of acetone was refluxed for three hours with Raney nickel (five teaspoonfuls, approximately 40 g. of wet nickel). The mixture was then allowed to stand for forty-eight hours at room temperature and filtered over a filter aid "hyflo." Solvents were removed, the residue taken up in 2 N hydrochloric acid and washed once with ether. The base was precipitated with ammonium hydroxide and extracted into methylene chloride (3 x 50 ml.). The organic fractions were combined, washed with water (2 x 50 ml.), dried over anhydrous sodium sulfate, filtered and evaporated. The residual oil was dissolved in ether and filtered through 50 g. of grade I, neutral alumina. Removal of the solvent and crystallization from hexane gave 1,2-dihydro-1-methyl - 5 - phenyl-3H-1,4-benzodiazepine as white rods, M.P. 113–115°.

The mother liquors were concentrated and the precipitated product consisting of 1,2-dihydro-1-methyl-5-phenyl-3H-1,4-benzodiazepine as white rods and 5-(4-chlorophenyl) - 1,2-dihydro-1-methyl-3H-1,4-benzodiazepine as yellow prisms was mechanically separated to give yellow prisms of 5-(4-chlorophenyl)-1,2-dihydro - 1 - methyl-3H-1,4-benzodiazepine, which upon being recrystallized from methanol melted at 151–153°.

The above-mentioned 5-(4-chlorophenyl)-1-methyl-3H-1,4-benzodiazepin-2(1H)-thione, its preparation and intermediates therefor are not a part of this invention but such are disclosed hereinbelow in order that the present disclosure may be complete.

137 g. of anthranilic acid was dissolved in 250 cc. dimethylformamide. The solution was cooled to 0° and 85 cc. (155 g.) of thionyl chloride was added dropwise, keeping the temperature of the reaction mixture below 40°. After allowing the mixture to cool to room tempertaure, 750 cc. of acetone was added. It was then cooled to 0°. The white 2-dimethylformamidinoanthranilic acid hydrochloride which separated was filtered off, washed with 300 cc. of cold acetone and sucked dry.

To a stirred suspension of 58 g. of 2-dimethylformamidinoanthranilic acid hydrochloride in 750 cc. of chlorobenzene was added in portions 60 g. of phosphorus pentachloride. The mixture was heated on the steambath for 2 hours and cooled in ice to 10°. 135 g. of aluminum chloride was added in 4 portions, keeping the temperature of the reaction mixture below 10°. After completion of the addition of the aluminum chloride, the mixture was heated on the steambath for 3 hours at 95°.

The reaction mixture was cooled in ice and 400 g. of crushed ice was added in portions, keeping the temperature below 40°. Next, 500 cc. of 40% sodium hydroxide was added dropwise, again keeping the temperature of the reaction mixture below 40°. The pH at this point was about 11. Heating on the steambath at 95° for 4 hours followed, then cooling to 40°. The mixture was transferred to a separatory funnel and the chlorobenzene phase was separated. The aqueous phase was extracted with three 100 cc. portions of chlorobenzene and the combined chlorobenzene phases were concentrated in vacuo on the steambath, yielding an oily residue. The oil was refluxed with stirring in a mixture of 150 cc. of ethanol, 75 cc. of water and 75 cc. of 10% sodium hydroxide for 24 hours. The solvents were distilled off at atmospheric pressure, the mixture was cooled and 500 cc. of water was added dropwise with stirring. After standing in the refrigerator overnight, the solid yellow product, 2-amino-4'-chlorobenzophenone, was filtered off, sucked dry, dried in vacuo at room temperature over sodium hydroxide, then crystallized from 200 cc. of hot ethanol in the form of yellow needles, M.P. 98–99°.

A stirred mixture of 15.5 g. of 2-amino-4'-chlorobenzophenone, 35 cc. of pyridine and 15 g. of glycine ethyl ester hydrochloride was slowly distilled at 115–120°, with the pyridine being replaced dropwise to keep the volume unchanged. After 5 hours, the reaction mixture was concentrated to dryness in vacuo. The residue was heated on the steambath with 50 cc. of benzene and 50 cc. of water. The extract was decanted and the residue was re-extracted with 50 cc. of benzene and 50 cc. of water. The insoluble brown precipitate was filtered off and sucked dry. The crude product, 5 - (p - chlorophenyl) - 3H - 1,4 - benzodiazepin-2(1H)-one, was recrystallized twice from ethanol to obtain white plates melting at 262–263°.

To a solution of 15 g. of 5-(4-chlorophenyl)-3H-1,4-benzodiazepin-2(1H)-one in 45 ml. of N,N-dimethylformamide, a solution of 1.2 g. of sodium in 12 ml. of methanol was added and the mixture stirred for 30 minutes at room temperature. The solution of the sodio derivative was cooled to —5° and 34.5 g. of methyl iodide added dropwise over 10 minutes, keeping the temperature at between —3° and 0°. Stirring was continued for 10 minutes at 0° and then at room temperature for 1 hour. The mixture was poured into 1 l. of water, and the mixture was extracted with methylene chloride (3 x 150 ml.). The organic extracts were combined, washed with water (3 x 200 ml.), dried over anhydrous sodium sulfate, and filtered over a small column of alumina, neutral grade I. The solvent was then evaporated and the residue crystallized from methanol, yielding 5-(4-chlorophenyl)-1-methyl-3H-1,4-benzodiazepin-2(1H)-one as white prisms melting at 160–162°.

A solution of 6.0 g. of 5-(4-chlorophenyl)-1-methyl-3H-1,4-benzodiazepin-2(1H)-one in 45 ml. of dry pyridine was treated with 5.1 g. of phosphorus pentasulfide and refluxed for 1 hour. The pyridine was then removed by distillation, the last traces being co-distilled with added toluene. 100 ml. of ice-water was then added to the mixture and the product extracted into methylene chloride (3 x 50 ml.). The organic layers were combined, washed with water, (2 x 50 ml.), dried over anhydrous sodium sulfate, filtered over 50 g. of "Woelm" activity I, neutral alumina and concentrated. The crystalline residue was recrystallized from methanol yielding 5-(4-chlorophenyl)-1-methyl-3H-1,4-benzodiazepin-2(1H)-thione as pale yellow rods melting at 181–182°.

*Example 29*

A solution of 3.1 g. of 7-chloro-4-methyl-5-phenyl-4,5-dihydro-3H-1,4-benzodiazepin-2(1H)-one in 75 ml. of pure tetrahydrofuran was added to a solution of 0.82 g. of lithium aluminum hydride in 100 ml. of pure tetrahydrofuran. The mixture was refluxed with stirring for four hours on a steambath and then cooled. Excess lithium aluminum hydride was decomposed with a mixture of ethyl acetate and ether (1:1), and a saturated potassium bicarbonate solution was then added until the solid coagulated. This was filtered using suction and the filter cake washed thoroughly with ether. The combined filtrates were washed with water (3 x 100 ml.), dried over anhydrous sodium sulfate and filtered over 10 g. of grade I neutral alumina. The solvent was removed and the residue crystallized from an ether, petroleum ether mixture to give the product, 7-chloro-1,2,4,5-tetrahydro-4-methyl-3H-1,4-benzodiazepine, as colorless prisms melting at 107–109°. The base was dissolved in ether and hydrogen chloride was bubbled in until precipitation was complete. The salt was filtered and recrystallized from an acetone, ether mixture to give the hydrochloride, as white prisms, melting at 155–175°.

*Example 30*

A suspension of 126.5 g. of 1-methyl-7-nitro-5-phenyl-1,2-dihydro-3H-1,4-benzodiazepine in 2.2 l. of methanol was hydrogenated at room temperature and atmospheric pressure in the presence of 5 tablespoonfuls of Raney nickel. After the absorption of 1.35 moles of hydrogen (3 hours) the Raney nickel was filtered off, the filtrate acidified with an excess of methanolic hydrogen chloride and the solution concentrated in vacuo, with stirring, to a smaller volume. Ether was added and the precipitated crystals were filtered off giving orange prisms of 7-amino-1-methyl-5-phenyl-1,2-dihydro-3H-1,4-benzodiazepine dihydrochloride which, after recrystallization from a mixture of methanol and ether, melted at 267–268°.

An ice-cold solution of 20 g. of 7-amino-1-methyl-5-phenyl-1,2-dihydro-3H-1,4-benzodiazepine dihydrochloride in water was made alkaline with 50% potassium hydroxide and extracted with methylene chloride. The organic layer was separated, dried, concentrated to a small volume and treated with petroleum ether. The crystalline base, 7-amino-1-methyl-5-phenyl-1,2-dihydro-3H-1,4-benzodiazepine, was separated by filtration and recrystallized from ether to form yellow prisms melting at 158–159°. The so-prepared compound is useful, inter alia, as an appetite depressant.

*Example 31*

2.7 g. of 7-nitro-5-phenyl-1,2-dihydro-3H-1,4-benzodiazeprine dissolved in 100 ml. of methanol was hydrogenated at room temperature and atmospheric pressure in the presence of 3 g. of wet Raney nickel. After 1 hour, 0.03 mole of hydrogen was absorbed and the uptake came to a complete standstill. The cataylst was removed by filtration and the solution concentrated in vacuo to dryness. The residue was dissolved in methanol and acidified with an excess of methanolic hydrogen chloride. The crystalline 7-amino-5-phenyl-1,2-dihydro-3H-1,4-benzodiazepine dihydrochloride was precipitated by the addition of ether and, after recrystallization from a mixture of methanol and ether, formed yellow needles melting above 250°.

A solution of 1.6 g. of 7-amino-1-methyl-5-phenyl-1,2-dihydro-3H-1,4-benzodiazepine dihydrochloride in a mixture of 20 ml. of pyridine and 10 ml. of acetic anhydride was left at room temperature for 60 hours. The precipitated crystalline hydrochloride of the reaction product was separated by filtration and dissolved in ice water. The base was liberated by treatment with dilute sodium hydroxide and extracted with methylene chloride. The organic layer was dried, concentrated in vacuo and the residue was crystallized from ether, yielding 7-acetamido-1 - methyl - 5 - phenyl - 2,3 - dihydro - 1H - 1,4 - benzodiazepine which, after recrystallization from a mixture of methylene chloride and petroleum ether, formed yellow prisms melting at 176–177°.

*Example 32*

To a cooled (0° to +5°), stirred solution of 12.4 g. of 7 - amino - 1 - methyl - 5 - phenyl - 1,2 - dihydro - 3H - 1,4-benzodiazepine dihydrochloride in 40 ml. of 1 N hydrochloric acid, there was added within 10 minutes, 40 cc. of 1 N aqueous sodium nitrite. The diazonium chloride solution formed was added within 10 minutes to a hot (80–90°), stirred solution of 3.8 g. of cuprous chloride in 70 ml. of concentrated hydrochloric acid which had been diluted with 35 ml. of water. The mixture was kept for 10 more minutes at 80–90°, and was then cooled. Ice, water and an excess of ammonium hydroxide were added, and the reaction product then extracted with methylene chloride. The organic layer was dried, concentrated in vacuo to dryness and the residue was dissolved in methanol. An excess of methanolic hydrogen chloride was added and the solution was concentrated in vacuo to dryness. Isopropanol was added to the residue and the crude reaction product was separated by filtration. This product was repeatedly crystallized from isopropanol yielding 7-chloro-5-phenyl-1-methyl-1,2-dihydro-3H-1,4-benzodiazepine hydrochloride melting at 250–251° (dec.). It was identical with a sample prepared according to the procedure set forth in Example 11 above.

The same compound was also prepared as follows: To a solution of 10.2 g. of 7-chloro-5-phenyl-1,2-dihydro-3H-1,4-benzodiazepine in 100 ml. of dimethylformamide was added with stirring 2 g. of a 53% mineral oil dispersion of sodium hydride. The mixture was heated in a 65° water bath for 35 minutes and cooled to room temperature; then 3.6 ml. of methyl iodide was added thereto. After stirring for 30 minutes, the reaction mixture was poured into ice water and extracted with methylene chloride. The organic layer was separated, dried and concentrated in vacuo to dryness. The residue was dissolved in a small amount of a mixture of ether and petroleum ether (1:1) and adsorbed on a chromatographic column (3.5 cm. diameter) prepared with 300 g. of "Woelm" grade I alumina and the same solvent mixture. The column was eluted first with 2.8 l. of an ether, petroleum ether mixture (1:1), then with 500 ml. of a 75% ether, petroleum ether mixture (3:1), followed by 500 ml. of absolute ether. The eluates were combined and concentrated in vacuo. The residue was crystallized from a small amount of a mixture of ether and petroleum ether yielding crude 7-chloro-5-phenyl-1-methyl-1,2-dihydro-3H-1,4-benzodiazepine hydrochloride.

*Example 33*

To a cooled (0° to +5°), stirred solution of 12.4 g. of 7-amino-1-methyl-5-phenyl - 1,2 - dihydro - 3H - 1,4-benzodiazepine dihydrochloride in 40 ml. of 1 N hydrochloric acid was added within 10 minutes 40 cc. of 1 N sodium nitrite. The diazonium chloride solution formed was added within 12 minutes to a hot (80–90°), stirred suspension of 8 g. of cuprous cyanide in 300 ml. of dimethylformamide. The reaction mixture was cooled to 60°, diluted with 200 ml. of ammonium hydroxide (58%) and extracted with benzene. The organic layer was dried and concentrated in vacuo. The residue was extracted with boiling ether, and the ether soluble part filtered and concentrated in vacuo yielding an oily residue which was dissolved in 80 ml. of ether and adsorbed on a chromatographic column prepared with 140 g. of "Woelm" grade I alumina, and the product then eluted with ether. Concentration of the first 750 ml. of eluent yielded an oil which crystallized from a mixture of ether and petroleum ether, and was recrystallized from ether, yielding 7-cyano - 1 - methyl-5-phenyl-1,2-dihydro-3H-1,4-benzodiazepine as slightly yellow plates melting at 149–150°.

*Example 34*

A solution of 50 g. of 2-chloro-5-nitrobenzophenone in a mixture of 100 ml. of 1,2-propylenediamine and 450 ml. of pyridine was stirred and refluxed for 6 hours. The reaction mixture was concentrated in vacuo to a smaller volume and the crystalline reaction product was filtered off and upon recrystallization from methylene chloride formed yellow plates of 3-methyl - 7 - nitro-5-phenyl-1,2-dihydro-3H-1,4-benzodiazepine melting at 249–250°.

A solution of 2 g. of 3-methyl-7-nitro-5-phenyl-1,2-dihydro-3H-1,4-benzodiazepine in 40 ml. of 3 N hydrochloric acid was refluxed for 21 hours, cooled, made alkaline with dilute sodium hydroxide and extracted with methylene chloride. The organic layer was separated, dried and concentrated in vacuo. The residue was crystallized from a mixture of methylene chloride and ether. The first crop of crystals was starting material. From the filtrate crystalline reaction product was obtained which, after recrystallization from the same solvent mixture, formed yellow needles of 2-(2-aminopropylamino)-5-nitrobenzophenone melting at 98–99°. Refluxing of a pyridine solution of this compound caused re-cyclization to 3-methyl-7-nitro - 5 - phenyl-1,2-dihydro-3H-1,4-benzodiazepine.

A solution of 2-(2-aminopropylamino)-5-nitrobenzophenone in 10 ml. methanol was acidified with an excess of methanolic hydrogen chloride. Ether was added, and the crystalline hydrochloride was separated by filtration. After recrystallization from methanol/ether it formed yellow prisms melting at 204–205°.

A suspension of 28.1 g. of 3-methyl-7-nitro-5-phenyl-1,2-dihydro - 3H - 1,4-benzodiazepine in 250 cc. of methanol was hydrogenated at room temperature and atmospheric pressure in the presence of 6 g. of wet Raney nickel catalyst. After the absorption of 0.3 mole of hydrogen, the reaction came to a complete stop. The catalyst was filtered off, the filtrate acidified with an excess of methanolic hydrogen chloride and concentrated in vacuo to dryness. Ethanol was added to the residue and the crude reaction product was separated by filtration. Recrystallization from a mixture of ethanol and ether yielded 7-amino - 3 - methyl - 5 - phenyl-1,2-dihydro-3H-1,4-benzodiazepine dihydrochloride as yellow prisms which darkened at 265° and melted with decomposition at 277–280°. The base was liberated from the hydrochloride by treatment with alkali. It crystallized from ether in brown prisms melting at 128–129°.

*Example 35*

A solution of 2 g. of 7-nitro-5-phenyl-1,2-dihydro-3H-1,4-benzodiazepine in a mixture of 20 ml. of ethanol and 20 ml. of 3 N hydrochloric acid was refluxed for 18 hours. The reaction mixture was then concentrated in vacuo and the residue was crystallized from methanol to yield crude 2-(2-aminoethylamino)-5-nitrobenzophenone hydrochloride. After recrystallization from a mixture of methanol and ether, it formed yellow needles melting at 225–227° (dec.).

The base was liberated from the hydrochloride with alkali and after crystallization from ether formed yellow prisms melting at 118–119°. It could be re-cyclized to 7-nitro-5-phenyl-1,2-dihydro-3H-1,4-benzodiazepine by refluxing a 5% solution in pyridine for 2.5 hours.

*Example 36*

To a stirred suspension of 0.76 g. of lithium aluminum hydride in 25 ml. of dry tetrahydrofuran was added a solution of 2.84 g. of 7-chloro-3-methyl-5-phenyl-3H-1,4-benzodiazepin-2(1H)-one in 50 ml. of tetrahydrofuran. The reaction mixture was refluxed for 25 minutes then cooled with ice and treated with ether saturated with water. The insoluble precipitate was separated by filtration, and the filtrate dried and concentrated in vacuo. The residue was dissolved in 0.1 N hydrochloric acid and the solution filtered by gravity. The filtrate was made alkaline with dilute sodium hydroxide and extracted with methylene chloride. The organic layer was separated, dried and concentrated in vacuo to dryness. The residue was crystallized from a mixture of ether and petroleum ether, and the crude reaction product was separated by filtration. Recrystallization from the same solvent mixture yielded 7-chloro-3-methyl-5-phenyl-1,2-dihydro-3H-1,4-benzodiazepine as pale yellow prisms melting at 127–128°.

The same compound was prepared as follows: To a cooled stirred solution of 6.4 g. of 7-amino-3-methyl-5-phenyl-1,2-dihydro-3H-1,4-benzodiazepine dihydrochloride in 30 ml. of 6 N hydrochloric acid was added within ten minutes 20 ml. of 1 N sodium nitrite solution while the temperature was kept below +5°. The solution was stirred an additional 15 minutes at 0° and then added within 5 minutes to a stirred solution (temperature: 28°) of 4 g. of cuprous chloride in 40 ml. of concentrated hydrochloric acid. The mixture was stirred at room temperature for 15 minutes, heated to 40° for 30 minutes, then heated to 85–90° for 20 minutes. The reaction mixture was then cooled, treated with an excess of ammonium hydroxide and extracted with methylene chloride. The organic layer was dried, concentrated in vacuo and the residue was dissolved in ether and filtered by gravity through 60 g. of "Woelm" alumina I. The first 250 cc. of ether gave upon concentration an oily residue which was crystallized from a mixture of ether/petroleum ether and yielded crystalline reaction product which upon one recrystallization from the same solvent mixture melted at 126–127°. The reaction product gave no melting point depression with a sample of the product prepared according to the method set forth in the paragraph immediately above and showed also an identical infrared spectrum.

*Example 37*

2-chloro-5-trifluoromethylbenzophenone (200 g.) was dissolved in anhydrous pyridine (250 ml.) and treated with ethylenediamine (210 g.). The solution was stirred and refluxed during five hours, with protection from atmospheric moisture. The dark colored mixture was then evaporated in vacuo, and the oily residue was dissolved in methylene chloride (1 l.). This solution was washed with water (0.5 l.), containing sufficient sodium carbonate to make the aqueous layer strongly basic. The methylene chloride extract was further washed with water until the washings were neutral, then dried over anhydrous sodium sulfate and evaporated in vacuo, to give the crude product as a light brown oil which was dissolved in methanol (200 ml.), and the resulting solution was slowly poured into stirred ice-cold 1 N hydrochloric acid (4 l.), resulting in precipitation of a yellow hydrochloride. The mixture was stirred overnight at room temperature, and then the yellow precipitate was filtered off and washed with ether. The aqueous and ether filtrates were shaken together and separated and the ether layer was washed with water until neutral. The aqueous acid layer together with the yellow-colored washings were combined with the precipitated hydrochloride, and the mixture carefully made basic by dropwise addition of 5 N sodium hydroxide solution, with cooling and stirring of the mixture. The resulting precipitate was extracted with methylene chloride, and the extract was washed with water, dried over sodium sulfate and evaporated to give a yellow-brown gum, which consisted mostly of the desired base, 2,3-dihydro-5-phenyl-7-trifluoromethyl-1H-1,4-benzodiazepine, and another compound, 2-(2-aminoethylamino)-5-trifluoromethylbenzophenone. This mixture was dissolved in pyridine (600 ml.), and the solution was refluxed during three hours to effect cyclization of the aminoketone. Evaporation of the pyridine solution yielded a brown gum, which was purified by dissolving it in methylene chloride, washing the solution with water (3 x 250 ml.), drying over sodium sulfate, followed by filtration of the solution through a short wide chromatography column containing "Woelm" neutral alumina, activity III (125 g.). Evaporation of the eluates, and recrystallization of the residue from a mixture of benzene (150 ml.) and hexane (1 l.) yielded 2,3-dihydro-5-phenyl-7-trifluoromethyl-1H-1,4-benzodiazepine as yellow prisms, which upon recrystallization from hexane formed pale yellow prisms, M.P. 116–118°. This material appeared to be a dimorphic crystalline form of that described in Example 20 above; the two compounds had identical infrared spectra in chloroform solution, identical $R_f$ values in thin-layer chromatography, and were interconvertible by recrystallization from hexane. Both compounds formed the same monohydrochloride described in Example 20 above.

*Example 38*

10 mmole of 1-methyl-5-(2-trifluoromethylphenyl)-3H-1,4-benzodiazepine-2(1H)-thione was dissolved in 80 ml. of acetone and treated with 3.3 teaspoonfuls of washed Raney nickel (i.e. about 27 g. of settled Raney nickel when weighed wet with ethanol) prepared according to the procedure set forth in Example 10 above, and then heated under reflux for 2 hours with stirring. The mixture was then cooled, and the mixture filtered and the solid residue washed with ethanol. The combined filtrates were evaporated and the residue was dissolved in a mixture of ice-cold aqueous 1 N hydrochloric acid (100 ml.) and ether (100 ml.). The aqueous layer was rendered basic with sodium hydroxide solution, and extracted with ether. The extract was washed with water, dried over anhydrous magnesium sulfate and evaporated yielding a crude crystalline product which was dissolved in methanolic 2 N hydrochloric acid (1.1 equivalents). The resulting solution was evaporated, the residue triturated with ether and filtered giving orange-yellow prisms of 1-methyl-5-(2-trifluoromethylphenyl)-1,2-dihydro-3H-1,4-benzodiazepine hydrochloride. These prisms were recrystallized from ethanol/ether, and reconverted to the free base by treatment with a dilute sodium hydroxide solution and ether. The ether layer was washed with water, dried over anhydrous magnesium sulfate and evaporated, yielding cream-colored prisms which upon recrystallization from hexane formed colorless prisms of the free base, 1-methyl-5-(2-trifluoromethylphenyl)-1,2-dihydro-3H-1,4-benzodiazepine, melting at 83–85°. The pure base was reconverted to the corresponding hydrochloride by addition of methanolic hydrochloric acid. Upon recrystalization from ethanol/ether, the hydrochloride formed bright yellow prisms melting at 251–252°.

The above-mentioned 1-methyl-5-(2-trifluoromethylphenyl)-3H-1,4-benzodiazepine-2(1H)-thione, its preparation and intermediates therefor, are not a part of this invention, but such are disclosed hereinbelow in order that the present disclosure may be complete.

A solution of o-trifluoromethylphenyl magnesium bromide was prepared in the usual manner from 50.0 g. of o-bromo-benzotrifluoride, 5.55 g. of magnesium and 110 ml. of anhydrous ether. The Grignard reagent can also be prepared by reacting 39.7 g. of o-chlorobenzotrifluoride with 5.55 g. of magnesium in tetrahydrofuran. This solution was added with stirring at 20° over a period of 3 hours to a solution of 33.0 g. of 2-methyl-4H-3,1-benzoxazin-4-one in 300 ml. of methylene chloride. The resulting dark but clear solution was left at room temperature for 16 hours and was then poured over a mixture of 50 g. of ammonium chloride and 600 g. of crushed ice. Extraction with ether gave a crude reaction product which was directly hydrolyzed by refluxing for one hour in a mixture of 240 ml. of ethanol and 240 ml. of 3 N sodium hydroxide. After standing overnight, the reaction mixture was extracted with ether. The ether layer was washed with water and concentrated in vacuo yielding an oil. This was purified in two portions by chromatography on the 20-fold amount of neutral alumina (activity grade III; e.g. containing 6% of water). Elution with petroleum ether (60–70°) and a mixture of petroleum ether (60–70°) and ether (9:1) followed by crystallization from a mixture of ether and hexane yielded 2-amino-2'-trifluoromethylbenzophenone, melting at 94–96° (yellow prisms).

To a solution of 5.0 g. of 2-amino-2'-trifluoromethylbenzophenone in 25 ml. of anhydrous ether, cooled to 0°, 1.7 ml. of bromoacetylbromide was added with stirring; a precipitation occurred and the yellow color of the solution gradually faded. The suspension containing 2-bromoacetamido-2'-trifluoromethylbenzophenone (not isolated) was stirred for half an hour at 0° and for two hours at room temperature. After that, 25 ml. of liquid ammonia was condensed into the flask, by introducing ammonia gas and using an efficient Dry Ice-acetone condenser. The resulting mixture was stirred and refluxed (B.P. of liquid ammonia) for 3 hours. After taking off the condenser, the ammonia was allowed to evaporate overnight. The reaction mixture was extracted with ether (the ether layers being washed 3 times with water) and yielded crude 2-amino-2'-(2-trifluoromethylbenzoyl)acetanilide. Recrystallization from a mixture of 15 ml. of benzene and 15 ml. of hexane gave the pure product, melting at 141–142° (colorless, rhombic plates).

3.0 g. of 2-amino-2'-(2-trifluoromethylbenzoyl)acetanilide was heated in an open tube for 15 minutes to 200–205°, using an oil bath. Water was given off. On cooling a brown glass was obtained which, on crystallization from a mixture of methanol and ether, gave crude 5-(2-trifluoromethylphenyl)-3H-1,4-benzodiazepin-2(1H)-one. The mother liquor was evaporated to dryness, dissolved in benzene and chromatographed on 60 g. of neutral alumina (activity grade III, e.g. containing 6% of water). Elution with benzene (300 ml.) gave a product which could be crystallized to give some starting material. Then, with a benzene-ether-(1:1)-mixture (400 ml.), a crude product could be eluted. This, on crystallization from ether-hexane, gave the pure 5-(2-trifluoromethylphenyl)-3H-1,4-benzodiazepin-2(1H)-one, melting at 187–188° (almost colorless prisms).

5-(2-trifluoromethylphenyl)-3H-1,4 - benzodiazepin-2 (1H)-one (60.8 g.) was added at 20° to a solution of sodium methoxide, prepared from sodium (5.06 g.) and anhydrous methanol (500 ml.). The mixture was stirred for 15 minutes at room temperature, during which time all the solids dissolved. Methyl iodide (40 ml.) was then added dropwise to the stirred solution during 20 minutes and stirring was continued for a further 3 hours at room temperature. The solution was concentrated in vacuo at 25° and water (900 ml.) added to the residue. The mixture containing the resulting precipitate was extracted with methylene chloride. The extract was washed with water, dried over anhydrous magnesium sulfate and evaporated, to give the crude product as a green gum which rapidly crystallized. Recrystallization from ethanol-water, with addition of decolorizing carbon, gave blue crystals. Decolorization of the product was readily effected by dissolving it in methylene chloride and filtering the resulting solution through a short column of "Woelm" neutral alumina, activity V (400 g.). Evaporation of the eluates and recrystallization of the resulting residue from aqueous ethanol, with addition of decolorizing carbon, gave 1-methyl-5-(2-trifluoromethylphenyl)-3H-1,4-benzo - diazepin-2(1H)-one as very pale yellow crystals, melting at 137–138°. Further crops obtained from the mother liquors were purified by the above method and upon recrystallization from aqueous ethanol yielded colorless rhombs, melting at 135–137°.

1.0 mole of 1-methyl-5-(2-trifluoromethylphenyl)-3H-1,4-benzodiazepin-2(1H)-one in 2 l. of anhydrous pyridine (freshly distilled from barium oxide) was treated with 242 g. of phosphorus pentasulfide, and the mixture was then stirred and refluxed for one hour, with protection from atmospheric moisture. The pyridine solution was evaporated in vacuo, the residue was mixed with 500 ml. of toluene, which was likewise distilled off in vacuo to remove the remaining pyridine via co-distillation. The so-obtained residue was then extracted with cold methylene chloride, and the remaining undissolved material added portionwise to a mixture of ice and ice water. The mixture was extracted with methylene chloride, and the combined methylene chloride extracts from both extractions were washed with water, dried over anhydrous magnesium sulfate, and filtered through a short chromatography column containing "Woelm" neutral alumina, activity III (1 kg.). The eluates were concentrated and petroleum ether added thereto, yielding the crude product as pale yellow prisms which were crystallized from aqueous ethanol and then from ethanol, yielding 1-methyl-5-(2-trifluoromethylphenyl)-3H-1,4-benzodiazepine-2(1H)-thione as cream-colored prisms melting at 133–136°.

*Example 39*

10 ml. of 7-dimethylamino-1-methyl-5-phenyl-3H-1,4-benzodiazepine-2-(1H)-thione was treated with Raney nickel according to the procedure described in Example 38 above. The crude crystalline product was converted to the dihydrochloride by dissolution in methanolic 1 N hydrochloric acid (2.2 equivalents) followed by precipitation via addition of ether. There was thus obtained 7-dimethylamino-1-methyl-5-phenyl-1,2-dihydro-3H - 1,4-benzodiazepine dihydrochloride as orange prisms which were recrystallized from methanol/ethanol/ether. The so-obtained purified crystals were then treated with dilute sodium hydroxide and ether. The ether layer was washed with water, dried over anhydrous magnesium sulfate and evaporated. The resulting residue was twice recrystallized from aqueous ethanol, yielding the free base, 7-dimethylamino-1-methyl-5-phenyl-1,2 - dihydro-3H-1,4-benzodiazepine, as hexagonal plates melting at 115–117°. The free base was reconverted to the dihydrochloride via treatment with methanolic hydrochloric acid. Upon recrystallization from ethanol/ether the dihydrochloride melted at 252–254°.

The above-mentioned 7-dimethylamino - 1 - methyl-5-phenyl-3H-1,4-benzodiazepine-2(1H)-thione, its preparation and intermediates therefor, are not a part of this invention, but such are disclosed hereinbelow in order that the present disclosure may be complete.

48 g. of 5-phenyl-3H-1,4-benzodiazepin-2(1H)-one was dissolved in 250 cc. of concentrated sulfuric acid by stirring at 15° for ½ hour. The solution was then cooled to 0° and a mixture of 9.1 cc. of fuming nitric acid (90%—sp. gr.=1.50) and 11.8 cc. of concentrated sulfuric acid was added dropwise with stirring, keeping the temperature of the reaction mixture between —5° and 0°. After completion of the addition of the nitric acid-sulfuric acid mixture, stirring was continued for 1 hour and the reaction mixture was stored in the refrigerator overnight.

The mixture was then added dropwise to 2 kg. of crushed ice with stirring and cooling, keeping the temperature at 0°. After 1 hour of stirring in the cold, 640 cc. of concentrated ammonium hydroxide was added dropwise at 0° to pH 8. Stirring was continued for ½ hour and the crude product was filtered off, washed with a small amount of ice water and sucked dry overnight. The crude product was suspended in a mixture of 100 cc. of methylene chloride and 1700 cc. of alcohol. 50 g. of decolorizing charcoal was added and the mixture was refluxed with stirring for 2 hours. After standing overnight at room temperature 15 g. of diatomaceous earth filter aid was added and the refluxing was resumed for 1½ hours. The mixture was filtered while hot. The clear, light yellow filtrate was concentrated in vacuo on the steambath with stirring to about 600 cc. The concentrate was stirred and cooled in ice for about 2 hours; the precipitated crystalline product was filtered off, washed with some petroleum ether and sucked dry. The product, 7-nitro-5-phenyl-3H-1,4 - benzodiazepin-2(1H)-one, was recrystallized from a mixture of 1000 cc. of alcohol and 50 cc. of methylene chloride to obtain white prisms melting at 224–225°.

5.6 g. of 7-nitro-5-phenyl-3H-1,4-benzodiazepin-2(1H)-one was suspended in 75 cc. of methanol. 1.1 g. of sodium methylate was added with stirring. The clear yellow-brown solution was concentrated to dryness in vacuo giving the yellow sodio derivative. This sodio derivative was dissolved in 70 cc. of dimethylformamide. 3.8 cc. (8.52 g.) of methyl iodide was added dropwise, the temperature rising to 30°. The reaction mixture was cooled and stirred for 1½ hours. The clear brown solution was added to about 500 cc. of ice and water with stirring. The fine yellow precipitate was filtered off, washed with ice water, sucked dry and dried in vacuo at 50° over sodium hydroxide. The pure 1-methyl-7-nitro-5-phenyl-3H-1,4-benzodiazepin-2(1H)-one crystallized in needles from dilute ethanol and melted at 156–157°.

To a solution of 25 g. of 1-methyl-7-nitro-5-phenyl-3H-1,4-benzodiazepin-2(1H)-one in 600 ml. of methanol was added 50 ml. of a 37% solution of aqueous formaldehyde and ca. 8 g. of Raney nickel. The mixture was shaken under an initial pressure of 8 atm. hydrogen. After 2 to 3 hours the theoretical amount (5 moles of hydrogen per mole of substance) had been taken up and the pressure remained constant. The solution was filtered from the catalyst and the main amount of methanol was removed in vacuo. Yellow prisms of 7-dimethylamino-1-methyl-5-phenyl-3H-1,4-benzodiazepin-2(1H)-one separated which after recrystallization from a mixture of ethanol, ether and hexane melted at 141–143°.

1.0 mole of 7-dimethylamino-1-methyl-5-phenyl-3H-1,4-benzodiazepin-2(1H)-one was treated with phosphorus pentasulfide according to the method described in Example 38, whereby, upon the addition of petroleum ether, there was obtained a crude product which was recrystallized from aqueous ethanol and then from ethanol, yielding 7-dimethylamino-1-methyl-5-phenyl-3,H-1,4-benzodiazepine-2(1H)-thione as yellow prisms melting at 185–187°.

*Example 40*

A suspension of 1.20 g. of lithium aluminum hydride in 100 ml. of anhydrous tetrahydrofuran was stirred and refluxed for 0.5 hour, with protection from atmospheric moisture. The mixture was then cooled to room temperature, and 15.6 m. mole of 7-bromo-5-phenyl-3H-1,4-benzodiazepin-2(1H)-one in 150 ml. of anhydrous tetrahydrofuran was added thereto as rapidly as the vigorous reaction permitted (i.e. in the course of about 10 minutes). The mixture was then stirred and refluxed on a steambath for 4 minutes, allowed to cool spontaneously for another 5 minutes, and then rapidly cooled in an ice bath. The reaction mixture was then permitted to stand for a further 45 minutes at room temperature (25–27°), and then the mixture was stirred and cooled in an ice bath during the dropwise addition of 10 ml. of a saturated aqueous solution of sodium sulfate to decompose excess of lithium aluminum hydride. Stirring was continued for one hour at room temperature, followed by the addition of anhydrous sodium sulfate to dry the solution. The insoluble inorganic salts were then filtered off on a bed of filter aid (hyflo), and were thoroughly washed with ether. The combined filtrates were then evaporated in vacuo yielding a crude product which was dissolved in 300 ml. of ether. This was then extracted with 100 ml. of 1 N hydrochloric acid and then with 80 ml. of 1 N hydrochloric acid. The acid extracts were combined, cooled in an ice bath, and rendered basic by the addition of 3 N sodium hydroxide solution. The resulting precipitated product was extracted with ether, the extract washed with water until neutral, dried over anhydrous magnesium sulfate and evaporated. The residue was dissolved in a small volume of cold methanol, and methanolic 2 N hydrochloric acid (1.1 equivalents) added thereto. The resulting solution was evaporated in vacuo at 25°, and the residue was recrystallized from ethanol/ether. The so-obtained hydrochloride was then reconverted to the free base, via treatment with dilute aqueous sodium hydroxide and extraction with ether. The extract was washed with water until neutral, dried over magnesium sulfate, and evaporated, yielding a yellow crystalline residue which was crystallized from aqueous ethanol yielding 7-bromo-2,3-dihydro-5-phenyl-1H-1,4-benzodiazepine as yellow plates melting at 172–175°.

The above-mentioned 7-bromo-5-phenyl-3H-1,4-benzodiazepin-2(1H)-one, its preparation and intermediates therefor, are not a part of this invention, but such are disclosed hereinbelow in order that the present disclosure may be complete.

A mixture of 27.6 g. of 2-amino-5-bromobenzophenone, 21 g. of glycine ethyl ester hydrochloride and 300 ml. of pyridine was refluxed. After one hour, 21 ml. of pyridine was distilled off and then an additional 21 g. of glycine ethyl ester hydrochloride was added. The reaction mixture was then refluxed for 15 hours, concentrated partly at atmospheric pressure and then in vacuo. Ether and water were added to the residue, and the crude crystalline 7-bromo-5-phenyl-3H-1,4-benzodiazepin-2(1H)-one was filtered off. After recrystallization from acetone, the product formed colorless prisms melting at 220–221°.

*Example 41*

15.6 m. mole of 7-chloro-5-(2-fluorophenyl)-3H-1,4-benzodiazepin-2(1H)-one was treated with lithium aluminum hydride as described in Example 40 above. As described therein, the base was converted into the hydrochloride and the hydrochloride then reconverted to the base, giving, upon evaporation, the product in the form of a yellow foam which was crystallized from aqueous ethanol yielding 7-chloro-2,3-dihydro-5-(2-fluorophenyl)-1H-1,4-benzodiazepine as yellow prisms melting at 160–163°.

*Example 42*

5.0 g. of 7-methylmercapto-5-phenyl-3H-1,4-benzodiazepin-2(1H)-one was dissolved in 200 ml. of anhydrous tetrahydrofuran and treated with 2.0 g. of lithium aluminum hydride. The mixture was then stirred and refluxed for 2.5 hours, with protection from atmospheric moisture. The excess of lithium aluminum hydride was decomposed by the dropwise addition of 10 ml. of saturated aqueous sodium sulfate solution to the cooled reaction mixture. The solution was then dried with anhydrous sodium sulfate, the undissolved inorganic salts filtered off and washed with ether, and the combined filtrates and washings evaporated in vacuo, yielding the crude product as an oil which was dissolved in 13 ml. of methanol and treated with 13 ml. of methanolic 1.46 N hydrochloric acid, followed by dilution with ether and hexane to precipitate the hydrochloride of 7-methylmercapto-5-phenyl-2,3,4,5-tetrahydro-1H-1,4-benzodiazepine as pale yellow prisms, which were treated with dilute aqueous sodium hydroxide and extracted with ether. The extract was washed with water until neutral, dried over magnesium sulfate, and evaporated. The residue was then recrystallized from hexane yielding the base, 7-methylmercapto-5-phenyl-2,3,4,5-tetrahydro-1H-1,4-benzodiazepine, as colorless prisms melting at 101–103°.

The above-mentioned, 7-methylmercapto-5-phenyl-3H-1,4-benzodiazepin-2(1H)-one, its preparation and intermediates therefor, are not a part of this invention, but such are disclosed hereinbelow in order that the present disclosure may be complete.

30 g. of 2-aminobenzophenone and 40 g. of sodium thiocyanate were suspended in 100 cc. of methanol. After cooling to 0°, a cold solution of 9.5 cc. of bromine (28.5 g.=0.36 mole) dissolved in 35 cc. of cold methanol (saturated with sodium bromide) was added dropwise. After completing the addition, the reaction mixture was stirred in the cold for an additional ½ hour and poured into 1 liter of cold water. After neutralization with 110 cc. of 20% Na$_2$CO$_3$, the product, 2-amino-5-thiocyanobenzophenone, was filtered off and crystallized from dilute ethanol in the form of yellow plates, M.P. 83–84°.

39 g. of 2-amino-5-thiocyanobenzophenone was suspended in 200 cc. of ethanol. The mixture was heated to 50° on the steambath and a total of 55 g. of sodium hydrosulfite and 250 cc. of 10% NaOH were added alternately in portions. The temperature was raised to 80°. At this point the reaction mixture gave a blue coloration with indanthrene yellow paper, indicating the presence of an excess of Na$_2$S$_3$O$_4$, and the complete conversion of the thiocyano group into a mercapto-group.

After cooling to 40°, 20 cc. (27 g.=0.22 mole) of dimethylsulfate was added dropwise. A negative reaction with lead acetate at this point indicated the absence of free mercaptan. The mixture was stirred for 1 hour at room temperature and then the ethanol was distilled off. The aqueous phase was diluted with 700 cc. of water and the thioether was extracted with four 300 cc. portions of benzene. The benzene phase was dried and the solvent removed by vacuum distillation. The crude reaction product, 2-amino-5-methylmercaptobenzophenone, remained as a heavy oil, which upon crystallization from petroleum ether formed yellow crystals melting at 47–49°.

42 g. of 2-amino-5-methylmercaptobenzophenone was heated with 40 g. of glycine ethyl ester hydrochloride in 75 cc. of pyridine at 118–120° for 6 hours, distilling off the pyridine slowly and replacing it as needed. At the end of the heating period, the mixture was concentrated in vacuo and the residue was partitioned between 500 cc. of benzene and 200 cc. of water. The desired product was precipitated from the benzene phase by the addition of Skellysolve B and filtered off. The product, 7-methylmercapto-5-phenyl-3H - 1,4 - benzodiazepin - 2(1H) - one, crystallized from acetone as yellow needles melting at 216–218°.

Example 43

7-methyl-5-phenyl-3H-1,4-benzodiazepine-2(1H)-thione (2.66 g.) was dissolved in acetone (80 ml.) and desulfurized by refluxing the solution with Raney nickel as described in Example 38 above, yielding the crude base as a brown gum. This was converted to the hydrochloride by dissolving it in methanolic 2 N hydrochloric acid (1.1 equivalents), followed by evaporation of the resulting solution and recrystalization of the residue from isopropanol - acetone - ether. The resulting impure hydrochloride was re-converted to the base by treatment with dilute aqueous sodium hydroxide, and extraction with ether. The extract was dried over anhydrous magnesium sulfate, and evaporated, yielding the purified base as a light brown gum which was dissolved in methylene chloride and chromatographed over "Woelm" activity III neutral alumina (50 g.). Elution with methylene chloride and evaporation of the eluate gave the desired product as a pale brown gum, which soon started to crystallize. Recrystallizations from hexane, and then from aqueous ethanol, gave 7-methyl-2,3-dihydro-5-phenyl-1H-1,4-benzodiazepine as yellow plates, M.P. 130–132°.

The above-mentioned 7-methyl-5-phenyl-3H-1,4-benzodiazepine-2(1H)-thione, its preparation and intermediates therefor, are not a part of the instant invention, but such are disclosed hereinbelow in order that the present disclosure may be complete.

1.0 mole of 7-methyl-5-phenyl-3H-1,4-benzodiazepin-2(1H)-one in 2 l. of anhydrous pyridine (freshly distilled from barium oxide) was treated with 242 g. of phosphorus pentasulfide and the mixture was stirred and refluxed for 0.75 hour, with protection from atmospheric moisture. The reaction mixture was immediately chilled in an ice bath, with stirring, and the dark-colored pyridine solution was transferred to a separating funnel and added slowly to a well-stirred solution of sodium chloride (1500 g.) in water (5 l.), keeping the temperature of the mixture at less than 10° by ice cooling. The crude product precipitated as a dark-colored solid which was filtered off, washed well with water and dried at 80° in vacuo. The so-obtained residue was dissolved in methylene chloride, and the resulting solution filtered through a short chromatography column containing "Woelm" neutral alumina, activity III (1 kg.). Concentration of the light-colored eluates and addition of petroleum ether gave brown crystals which were crystallized from methylene chloride/petroleum ether and then from ethanol, yielding 7 - methyl - 5 - phenyl - 3H - 1,4 - benzodiazepine-2(1H)-thione as cream-colored prisms melting at 260–261°

Example 44

7 - chloro - 5 - (2 - methoxyphenyl) - 3H - 1,4 - benzodiazepine-2(1H)-thione (3.17 g.) was dissolved in acetone (80 ml.) and desulfurized by refluxing the solution with Raney nickel as described in Example 38 above, yielding the crude base as a tan-colored foam which was dissolved in methylene chloride and chromatographed over "Woelm" activity III neutral alumina (50 g.). Elution with methylene chloride gave only a trace of gum; further elution with methylene chloride-methanol (100:1), and evaporation of the eluate, yielded the desired base as a yellow gum, which partly crystallized. Recrystallization from acetone-petroleum ether (B.P. 40–60°) gave the product 7-chloro-2,3-dihydro-5-(2-methoxyphenyl)-1H-1,4-benzodiazepine as yellow prisms, which upon further recrystallizations from aqueous ethanol formed flat yellow prisms melting at 190–191°.

The above-mentioned 7-chloro-5-(2-methoxyphenyl)-3H-1,4-benzodiazepine-2(1H)-thione, its preparation and intermediates therefor, are not a part of the instant invention, but such are disclosed hereinbelow in order that the present disclosure may be complete.

A Grignard reagent prepared from 10.3 g. of o-bromanisole and 1.3 g. of magnesium in 100 cc. of ether was added slowly to an ice-cold solution of 9.8 g. of 6-chloro-2-methyl-3,1-4H-benzoaxazine-4-one in 150 cc. of benzene and 50 cc. of ether. A yellow precipitate formed. The reaction mixture was stirred for 1 hour in an ice bath and for 1 hour at room temperature. It was then chilled in an ice-salt bath and decomposed by the careful addition of 100 cc. of cold 2 N hydrochloric acid. The mother liquor was taken to dryness in vacuo and the residue crystallized from hexane to give 2-acetamino-5-chloro-2'-methoxybenzophenone, which after recrystallization from hexane was found to melt at 124–126°.

A solution of 3.9 g. of 2-acetamino-5-chloro-2'-methoxybenzophenone in 100 cc. of ethanol and 50 cc. of 6 N hydrochloric acid was refluxed for 2½ hours. Solvent was distilled off in vacuo and the residue stirred with dilute sodium hydroxide and benzene. The benzene layer was separated, dried over sodium sulfate and concentrated to dryness leaving as a residual yellow oil, crude 2-amino-5-chloro-2'-methoxybenzophenone. No attempt was made to crystallize the amine but it was dissolved in 150 cc. of ether, chilled in an ice bath and 20 cc. of water added. Then 3.1 g. of bromoacetyl bromide was slowly added with the simultaneous addition of 1 N sodium hydroxide to keep the reaction mixture slightly alkaline. The organic layer was separated, washed with water and dried over sodium sulfate. After distillation of solvent, a yellow oil remained which crystallized on standing. Recrystallization from acetonitrile afforded 2-bromoacetamino - 5 - chloro - 2' - methoxybenzophenone, M.P. 129–130.5°.

A solution of 2.4 g. of 2-bromoacetamino-5-chloro-2'-methoxybenzophenone in 100 cc. of 20% (w./v.) ammonia in methanol was kept at room temperature for 17 hours. Methanol and ammonia were distilled off in vacuo and the residue dissolved in benzene and water. The organic layer was dried over sodium sulfate and the solvent then evaporated in vacuo. The residue was crystallized from a mixture of benzene and hexane to give 7-chloro - 5 - (2 - methoxyphenyl) - 3H -1,4 - benzodiazepin-2(1H)-one, which after drying at 100° in vacuo, melted at 205.5–206.5°.

12.6 g. of 7-chloro-5-(2-methoxyphenyl)-3H-1,4-benzodiazepin-2(1H)-one was mixed with 80 ml. of anhydrous pyridine and 9.23 g. of phosphorus pentasulfide. The mixture was stirred and refluxed for 45 minutes, with protection from atmospheric moisture, during which time the solids rapidly dissolved. At the end of this time the mixture was cooled rapidly in an ice bath, and then the pyridine solution of products was added dropwise to a well-stirred saturated aqueous sodium chloride solution (500 ml.), cooled to 0–10° in an ice bath. The product precipitated as an oil, which was isolated by extraction with methylene chloride (500 ml., 2 x 200 ml.). The extract was washed with water, dried over magnesium sulfate, and filtered through a short chromatography column containing "Woelm" neutral alumina, activity III to remove most of the colored impurities. The methylene chloride eluates were concentrated to about 100–150 ml., followed by dilution with petroleum ether (40–60°; 500 ml.), to give the crude product as tan-colored prisms which upon recrystallization from benzene and then from ethanol yielded 7-chloro-5-(2-methoxyphenyl)-3H-1,4-benzodiazepine-2(1H)-thione as yellow needle-like prisms, melting at 222–224°.

*Example 45*

2,3 - dihydro - 5 - phenyl - 7 - trifluoromethyl - 1H - 1,4 - benzodiazepine (20.0 g.) was dissolved in aqueous 3 N hydrochloric acid (200 ml.) and the solution was stirred and refluxed for 10 hours. After cooling the mixture at 0° overnight, the resulting yellow crystalline product was filtered off, washed with ice-cold aqueous 3 N hydrochloric acid (20 ml.), and dried in vacuo at 25° over phosphorus pentoxide and potassium hydroxide pellets. 7 g. of this product was dissolved in hot pyridine (142 ml.), and the solution heated at the reflux temperature for 3 hours. During this time a yellow crystalline product commenced to precipitate. The mixture was evaporated in vacuo, and the resulting yellow crystalline residue was recrystallized from methanol-ether, giving crude 7-carboxy-2,3-dihydro-5-phenyl-1H-1,4-benzodiazepine hydrochloride monohydrate as orange-yellow needles, which upon further recrystallizations from methanol-ether and from water, formed flat yellow prisms melting at 315–316° (dec.).

7-carboxy-2,3-dihydro-5-phenyl-1H-1,4-benzodiazepine hydrochloride monohydrate (2.56 g.) was dissolved in methanol (50 ml.), and this solution was added portionwise to a solution of freshly distilled diazomethane (about 3 g.) in ether (200 ml.) at 0°. The homogeneous yellow solution was kep for 1 hour at 0–5°, and then the mixture was stirred in an ice bath while 50 ml. of aqueous 1 N hydrochloric acid was added dropwise. The mixture was then diluted with water (150 ml.), and then the aqueous acid layer was separated, cooled and made basic by addition of aqueous 3 N sodium hydroxide. The resulting suspension was extracted with ether, the extract was washed with water, dried over anhydrous magnesium sulfate, and evaporated to give the product as a light yellow crystalline residue which upon recrystallizations from methylene chloride-petroleum ether (40–60°), and from aqueous ethanol then yielded the desired 7-carbomethoxy-2,3-dihydro-5-phenyl-1H-1,4-benzodiazepine as very pale yellow flat prisms, melting at 191–193°.

*Example 46*

A solution of 2.0 g. of 4-acetyl-7-chloro-4,5-dihydro-1 - ethyl - 5 - (2 - fluorophenyl) - 3H - 1,4 - benzodiazepin - 2(1H)-one in 50 ml. of anhydrous tetrahydrofuran was added slowly to a stirred suspension of 0.85 g. of lithium aluminum hydride in 30 ml. of tetrahydrofuran. The reaction mixture was refluxed for four hours, and excess lithium aluminum hydride was then decomposed with an ethereal ethyl acetate solution. Saturated aqueous potassium bicarbonate was added until a solid coagulate was formed. The oragnic phase was filtered, the precipitate was washed with ether and the combined filtrates were taken to dryness. The residual oil was dissolved in 100 ml. of ether, and the solution was washed with water (5 x 100 ml.), dried over anhydrous sodium sulfate, filtered and saturated with hydrogen chloride. The hydrochloride salt was filtered off and recrystallized from an acetone, ether mixture giving colorless prisms. The hydrochloride was reconverted to the base by dissolving in water and making the solution alkaline with dilute sodium hydroxide. The base was filtered off, dissolved in petroleum ether (B.P. 30°–60°), dried over anhydrous sodium sulfate, filtered, concentrated to a small volume and allowed to crystallize, yielding 7-chloro-1,4-diethyl-1,2,4,5-tetrahydro-5-(2-fluorophenyl)-3H-1,4-benzodiazepine melting at 92–94°.

The above mentioned 4-acetyl-7-chloro-4,5-dihydro-1-ethyl - 5 - (2 - fluorophenyl) - 3H - 1,4 - benzodiazepin - 2(1H)-one, its preparation and intermediates therefor, are not a part of the instant invention, but such are disclosed hereinbelow in order that the present disclosure may be complete.

A mixture of 20.0 g. of 7-chloro-4,5-dihydro-5-(2-fluorophenyl)-3H-1,4-benzodiazepin-(1H)-one, 25.0 ml. of acetic anhydride and 25.0 g. of hydrated sodium acetate, was warmed on a steambath at 60–70° for sixteen hours. Hot water (300 ml.) was then added slowly and the mixture cooled to room temperature. The product was filtered giving colorless plates which upon recrystallization from an acetone, cyclohexane mixture gave 4-acetyl-7-chloro-4,5-dihydro-5-(2-fluorophenyl)-3H-1,4-benzodiazepin-2(1H)-one as a dimorphous compound, melting at 122°, resetting by 140° and melting sharply at 203–204°.

A solution of 5.0 g. of 4-acetyl-7-chloro-4,5-dihydro-5-(2-fluorophenyl)-3H-1,4-benzodiazepin-2(1H)-one in 25 ml. of N,N-dimethylformamide was heated with 4.15 ml. of a solution of sodium methoxide in methanol (4.15 ml. of solution contains .235 g. of sodium methoxide). The resulting clear solution was cooled to —2° and 1.8 ml. (3.37 g.) of ethyl iodide was added. The reaction mixture was allowed to warm to room temperature, stirred for one hour and then diluted with 500 ml. of water. The product was filtered, washed with water and recrystallized from methanol giving colorless prisms of 4 - acetyl - 7 - chloro - 4,5 - dihydro - 1 - ethyl - 5 - (2 - fluorophenyl)-3H-1,4-benzodiazepin-2(1H)-one melting at 180–181°.

We claim:
1. A process which comprises reacting a compound of the formula

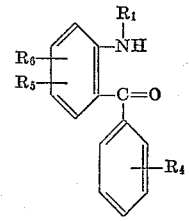

wherein
$R_1$ is selected from the group consisting of hydrogen, lower alkyl, lower alkenyl, and tosyl; $R_4$, $R_5$, and $R_6$ are selected from the group consisting of hydrogen, halogen, trifluoromethyl, nitro, lower alkanoylamino, lower alkylthio, lower alkylsulfonyl, lower alkylsulfinyl, lower alkoxy, lower alkyl, carboxy, carbo-lower alkoxy, cyano, carbamyl, and di-lower alkylamino;

with a β-acylaminoethyl halide and hydrolyzing the resultant compound of the formula

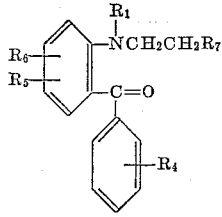

wherein $R_1$, $R_4$, $R_5$, and $R_6$ have the same meaning as above and $R_7$ is the acylamino moiety of the β-acylaminoethyl halide reactant.

2. A process which comprises reacting 2-amino-5-halobenzophenone with a β-acylaminoethyl halide and hydrolyzing the resulting 2-(β-acylaminoethylamino)-5-halobenzophenone.

3. A process which comprises reacting 2-amino-5-chlorobenzophenone with β-bromoethylbenzamide and hydrolyzing the resultant 2-(β-benzoylaminoethylamino)-5-chlorobenzophenone.

4. A process which comprises reacting 2-amino-5-chlorobenzophenone with β-bromoethylphthalimide and hydrolyzing the resultant 2-(β-phthaloylaminoethylamino)-5-chlorobenzophenone.

No references cited.